United States Patent
Freed et al.

(10) Patent No.: US 7,282,889 B2
(45) Date of Patent: Oct. 16, 2007

(54) MAINTENANCE UNIT FOR A SENSOR APPARATUS

(75) Inventors: Mason L. Freed, Walnut Creek, CA (US); Randall S. Mundt, Pleasanton, CA (US); Costas J. Spanos, Lafayette, CA (US)

(73) Assignee: OnWafer Technologies, Inc., Santa Clara, CA (US)

( * ) Notice: Subject to any disclaimer, the term of this patent is extended or adjusted under 35 U.S.C. 154(b) by 29 days.

(21) Appl. No.: 10/888,526

(22) Filed: Jul. 10, 2004

(65) Prior Publication Data

US 2004/0267501 A1 Dec. 30, 2004

Related U.S. Application Data

(63) Continuation-in-part of application No. 10/126,429, filed on Apr. 19, 2002, now Pat. No. 6,789,034.

(60) Provisional application No. 60/525,710, filed on Nov. 29, 2003, provisional application No. 60/285,439, filed on Apr. 19, 2001.

(51) Int. Cl.
*H01M 10/46* (2006.01)
(52) U.S. Cl. .................................... 320/108
(58) Field of Classification Search .............. 320/108, 320/112, 114, 115
See application file for complete search history.

(56) References Cited

U.S. PATENT DOCUMENTS

| | | | |
|---|---|---|---|
| 4,471,716 A | 9/1984 | Milleren | 118/500 |
| 4,574,950 A | 3/1986 | Koe | 206/334 |
| 4,888,473 A | 12/1989 | Rossi et al. | |
| 5,300,875 A | 4/1994 | Tuttle | |
| 5,330,053 A | 7/1994 | Tabuchi | 206/455 |
| 5,389,769 A | 2/1995 | Yamashita et al. | |
| 5,423,422 A | 6/1995 | Boire | 206/334 |
| 5,444,637 A | 8/1995 | Smesny | 364/556 |
| 5,457,447 A | 10/1995 | Ghaem et al. | |
| 5,950,817 A | 9/1999 | Iwamoto | 206/204 |
| 5,959,433 A * | 9/1999 | Rohde | 320/108 |
| 5,969,639 A | 10/1999 | Lauf | 340/870.17 |
| 6,042,324 A | 3/2000 | Aggarwal | 414/411 |
| 6,140,833 A | 10/2000 | Flietner et al. | |
| 6,186,331 B1 | 2/2001 | Kinpara | 206/711 |
| 6,244,121 B1 | 6/2001 | Hunter | 73/865.9 |
| 6,275,143 B1 | 8/2001 | Stobbe | |

(Continued)

FOREIGN PATENT DOCUMENTS

DE 4327342 2/1995

(Continued)

OTHER PUBLICATIONS

"Methods, Apparatus, and Computer Program Products for Obtaining Data for Process Operation, Optimization, Monitoring, and Control," by Mason L. Freed, Randall S. Mundt, and Costas J. Spanos, U.S. Appl. No. 60/285,439, filed Apr. 19, 2001.

(Continued)

*Primary Examiner*—Edward H Tso
(74) *Attorney, Agent, or Firm*—Larry Williams

(57) ABSTRACT

Presented are methods, systems, and apparatuses for managing and maintaining an electronic device such as a sensor apparatus.

37 Claims, 14 Drawing Sheets

U.S. PATENT DOCUMENTS

| | | | |
|---|---|---|---|
| 6,389,707 B1 | 5/2002 | Peiter | 33/645 |
| 6,398,032 B2 | 6/2002 | Fosnight | 206/711 |
| 6,427,850 B2 | 8/2002 | Mendiola | 211/41.18 |
| 6,527,442 B2 * | 3/2003 | Carroll | 378/189 |
| D479,399 S | 9/2003 | Tanaka et al. | |
| 6,625,497 B2 | 9/2003 | Fairbairn | 700/1 |
| 6,642,533 B2 | 11/2003 | Haraguchi | 250/559.33 |
| 6,691,068 B1 | 2/2004 | Freed et al. | |
| 6,808,352 B2 | 10/2004 | Seita | |
| 2004/0154417 A1 | 8/2004 | Renken et al. | |
| 2004/0225462 A1 | 11/2004 | Renken et al. | |
| 2005/0246127 A1 | 11/2005 | Renken et al. | |

FOREIGN PATENT DOCUMENTS

| | | |
|---|---|---|
| DE | 10314150 | 10/2004 |
| WO | WO2005091359 | 8/2003 |
| WO | WO2004/051713 A2 | 6/2004 |
| WO | WO2004099063 | 11/2004 |
| WO | WO2005109474 A1 | 11/2005 |

OTHER PUBLICATIONS

"Sensor Apparatus Automated Management Methods and Apparatus," by Mason L. Freed and Randall S. Mundt, U.S. Appl. No. 60/525,710, filed Nov. 29, 2003.

U.S. Appl. No. 60/430,858, filed Dec. 3, 2002, Renken et al.

U.S. Appl. No. 60/496,294, filed Aug. 19, 2003, Renken et al.

U.S. Appl. No. 60/512,243, filed Oct. 17, 2003, Renken et al.

* cited by examiner

MAINTENANCE UNIT FOR A SENSOR APPARATUS

CROSS-REFERENCES

The present application is a continuation in part of 10/126,429 filed on 19 Apr. 2002 now U.S. Pat. No. 6,789,034, which claims benefit of U.S. Provisional Patent Application No. 60/285,439 filed on 19 Apr. 2001, and the present application claims benefit of U.S. Provisional Patent Application No. 60/525,710 filed on 29 Nov. 2003. The present application is related to U.S. Provisional Patent Application No. 60/285,439 filed on 19 Apr. 2001, U.S. Pat. No. 6,691,068 filed on 22 Aug. 2000, U.S. patent application Ser. No. 10/126,429, filed on 19 Apr. 2002. All of these references are incorporated herein, in their entirety, by this reference.

BACKGROUND

This invention relates to improved methods, apparatus, and computer program products for applications such as measuring process conditions for processing workpieces, more particularly, for applications such as processing workpieces for electronic device fabrication.

The standard practice for using and managing a sensor apparatus such as an autonomous sensor wafer, such as that described in U.S. Pat. No. 6,691,068, is that the sensor apparatus is manually managed, i.e., a human is involved in one or more of the actions. The sensor apparatus is manually monitored for battery state, and the appropriate recharging regimen is preferably applied. When the sensor apparatus contains new data, the sensor apparatus must have communication initiated manually, and the data manually downloaded. When the sensor apparatus needs to be loaded into or unloaded from a process tool, the sensor apparatus is manually extracted from a container for the sensor apparatus. For some autonomous wafer sensors for semiconductor processing applications, the storage container for the sensor apparatus is a wafer cassette or front opening unified pod (FOUP). The sensor apparatus is removed from the storage container and placed into a charging station by a human using a vacuum wand or by picking the sensor apparatus up with gloved hands. Each of these manual operations prevents the sensor apparatus from being easily used in substantially automated production operations such as those preferred for operations such as semiconductor fabrication operations.

There are numerous applications requiring substantially autonomous sensor apparatuses and there is a need for overcoming one or more of the problems of the standard technology such as managing the sensor apparatus in the manufacturing environment, automating the management and maintenance of the sensor apparatus, and maximizing the overall manufacturing process. Examples of important applications are processing of workpieces such as semiconductor wafers, flatpanel displays, lithography masks, and other electronic devices. In order for the sensor apparatuses to be of greater use in a production environment, one or more of the manual operations should be automated.

SUMMARY

One aspect of the present invention includes an apparatus for maintaining and /or managing a sensor apparatus. Another aspect of the present invention includes a method of managing a sensor apparatus. Another aspect of the present invention includes a system for maintaining and/or managing a sensor apparatus. Another aspect of the present invention includes a computer program product for maintaining and/or managing a sensor apparatus. Another aspect of the present invention includes a method and apparatus for communication. Another aspect of the present invention includes a method and apparatus for charging a power source.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

Figure 1:
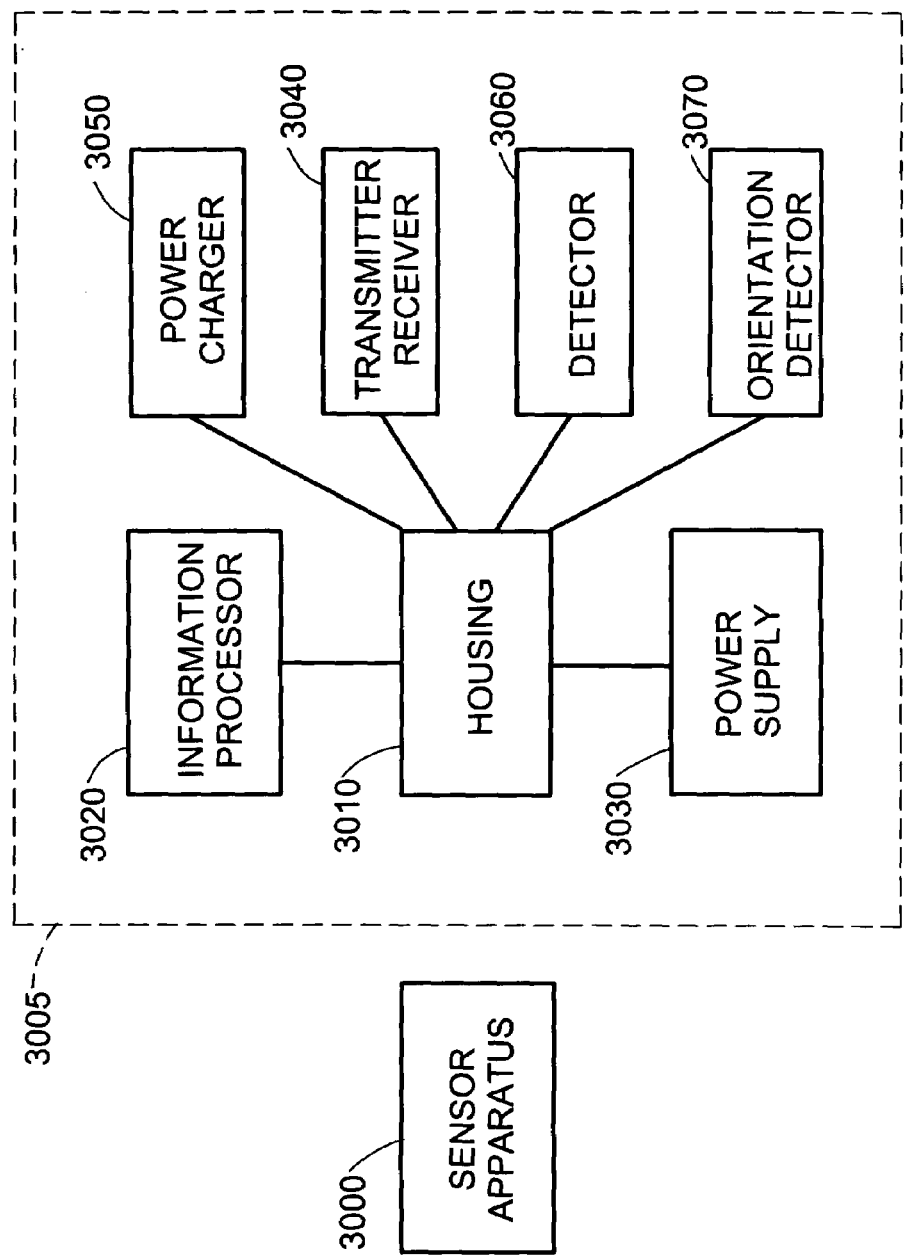
FIG. 1 is a box diagram of an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

The operation of embodiments of the present invention will be discussed below primarily in the context of a maintenance and management unit for a substantially autonomous sensor apparatus such as that described in U.S. Pat. No. 6,691,068 used for applications such as measuring one or more process conditions for processing electronic devices from semiconductor wafers. However, it is to be understood that embodiments in accordance with the present invention are not limited to a maintenance and management unit configured for applications of processing semiconductor wafers. Examples of other embodiments of the present invention are maintenance and management units configured for sensor apparatuses for measuring process conditions for manufacturing flat panel displays and sensor apparatuses for measuring process conditions for manufacturing lithography masks. Furthermore, most of the discussion of embodiments of the present invention is directed toward a sensor apparatus that includes a semiconductor wafer as a support and the sensor apparatus is configured to approximately mimic a semiconductor wafer substrate. It is to be understood that embodiments of the present invention can be configured for a wide variety of processes such as processes typically used for fabricating electronic devices from semiconductor wafers, such as processes typically used for fabricating flatpanel displays from flatpanel display substrates, and such as processes typically used for fabricating lithography masks. Some specific examples of individual processes are processes such as plasma etching, plasma deposition, plasma enhanced chemical vapor deposition, chemical vapor deposition, post-exposure bake for lithograpy, chemical mechanical planarization, and sputter deposition. In the following description of the figures, identical reference numerals have been used when designating substantially identical elements or steps that are common to the figures.

Reference is now made to FIG. 1 where there is shown a box diagram illustrating components of an embodiment of the present invention. The diagram in FIG. 1 shows a sensor apparatus 3000 and a maintenance unit 3005. Sensor apparatus 3000 is similar to sensor apparatuses described in U.S. Pat. No. 6,691,068 filed on 22 Aug. 2000; the contents of this reference are incorporated herein in their entirety by this reference.

FIG. 1 shows a physical configuration of components for a preferred embodiment of maintenance unit 3005. Maintenance unit 3005 includes a housing 3010, an information processor 3020, a power supply 3030, an information transmitter-receiver 3040, a power charger 3050 for coupling power from power supply 3030 to charge the sensor apparatus power source, a sensor apparatus detector 3060, and a sensor apparatus orientation detector 3070. The configuration of maintenance unit 3005 shown in FIG. 1 has information processor 3020, power supply 3030, information transmitter-receiver 3040, power charger 3050, sensor apparatus detector 3060, and sensor apparatus orientation detector 3070 connected with housing 3010. In a more preferred embodiment, housing 3010 substantially contains information processor 3020, power supply 3030, information transmitter-receiver 3040, power charger 3050, sensor apparatus detector 3060, and sensor apparatus orientation detector 3070.

Information processor 3020 may be a standard information processor such as a microprocessor, a computer, an application-specific integrated circuit, or another type of electronic device for processing information and executing commands. Power supply 3030 may be a standard power supply such as a rechargeable battery, a replaceable battery, a capacitor, a photoelectric cell, and a connection for accessing facility electrical power. Suitable power supplies are commercially available from numerous vendors. In a preferred embodiment of maintenance unit 3005, transmitter receiver 3040 is configured as a wireless communication device such as a device that uses infrared communication or such as a device that uses radio frequency communication.

Sensor apparatus detector 3060 is configured for detecting whether a sensor apparatus is present in maintenance unit 3005. Optionally, sensor apparatus detector 3060 may be configured so as to detector the presence of multiple sensor apparatuses or a sensor apparatus detector 3060 may be dedicated for each sensor apparatus that maintenance unit 3005 is capable of holding. In view of the present disclosure, a person of ordinary skill in the art could make a variety of configurations for sensor apparatus detector 3060. Some of the possible example configurations are a simple contact switch that detects the presence of a sensor apparatus, a switch that uses a light beam where changing the light beam path triggers the switch, and other configurations. One of the functions that can be performed by sensor apparatus detector 3060 could be to inform maintenance unit 3005 that maintenance should be started on a sensor apparatus that has been loaded into maintenance unit 3005. In other words, sensor apparatus detector 3060 can allow maintenance unit 3005 to begin the maintenance processes for a sensor apparatus automatically, i.e., without requiring an operator to start the maintenance processes.

Sensor apparatus orientation detector 3070 is configured to determine the orientation of sensor apparatus 3000 loaded into maintenance unit 3005. The orientation information for sensor apparatus 3000 can be included with data obtained from the sensor apparatus and made available for the data analysis. As an option, the orientation information can be utilized to establish whether sensor apparatus 3000 is properly loaded in maintenance unit 3005, and to enable a "go-no-go" flag for subsequent deployment of sensor apparatus 3000.

A variety of techniques can be used for determining the orientation of sensor apparatus 3000 when loaded into maintenance unit 3005. In one embodiment of the present invention, the determination of the orientation of sensor apparatus 3000 is made with an encoder configured for maintenance unit 3005 and sensor apparatus 3000. A method for determining orientation includes the formation of digitally encoded patterns at the edge of sensor apparatus 3000. The encoder includes an optical scanner such as one or more commercially available simple optical scanners. The patterns could be read by the optical scanner and the readings could be provided to information processor 3020 so that the readings are converted into orientation data. Accuracies of 1° or better can easily be achieved by this method.

Alternatively, the orientation of sensor apparatus 3000 can be determined by acquiring and analyzing an image of sensor apparatus 3000 as it sits in maintenance unit 3005. For this embodiment, sensor apparatus orientation detector 3070 includes a camera such as a digital camera. In one embodiment, the camera is disposed so as to view the center of sensor apparatus 3000 as placed in maintenance unit 3005. The image collected by the camera could then be compared in information processor 3020 with an image stored in information processor 3020, and relative information can thus be extracted with an accuracy of 1° or better. One of the benefits of this method is its relative simplicity, and the lack of any need to modify the sensor apparatus. Numerous other techniques are also possible and would be obvious to one of ordinary skill in the art, in view of the present disclosure.

Preferably, information processor 3020, power supply 3030, information transmitter-receiver 3040, power charger 3050, and sensor apparatus detector 3060 are substantially contained within housing 3010. In a more preferable embodiment, there is an electronics module (electronics module not shown in FIG. 1) comprising a second housing for substantially containing all or parts of information processor 3020, power supply 3030, information transmitter-receiver 3040, power charger 3050, and sensor apparatus detector 3060. Alternatively for some embodiments of the present invention, housing 3010 includes a compartment for substantially containing information processor 3020, power supply 3030, information transmitter-receiver 3040, power charger 3050, and sensor apparatus detector 3060.

As an optional addition for some embodiments of the present invention, housing 3010 also includes an information display for visually displaying information such as status information for maintenance unit 3005 and/or information about sensor apparatus 3000 maintained by maintenance unit 3005 (information display not shown in FIG. 1). The information display maybe a display such as a display of light emitting diodes and such as a liquid crystal display. The display may be configured in maintenance unit 3005 so that the display is visible from the exterior of maintenance unit 3005.

In a preferred embodiment, maintenance unit power supply 3030 comprises a rechargeable battery. Optionally, the maintenance unit further includes a status indicator for the maintenance unit power supply so that information about the status of the power supply can be visually displayed, stored, and/or transmitted. Similarly, the maintenance unit, optionally, may further comprise a status indicator for the sensor apparatus power source.

In a preferred embodiment, housing 3010 is configured for holding a substrate selected from the group consisting of a semiconductor wafer substrate, a flat panel display substrate, a lithography mask substrate, and a printed circuit board substrate.

For examples, housing 3010 may have configurations such as that of a standard mechanical interface box, a front opening unified pod, and a semiconductor wafer cassette.

In a preferred embodiment, information processor 3020 contains executable code for managing and maintaining sensor apparatus 3000. The executable code enables the maintenance unit greater independence in performing its tasks automatically. In a further embodiment, the maintenance unit may include an information storage memory combined with information processor 3020 for storing at least one of data, calibration coefficients, and commands.

The embodiment shown in FIG. 1 represents a preferred embodiment; other embodiments of the present invention may include fewer components than are shown in FIG. 1. Examples of other embodiments of the present are shown in FIG. 1A, FIG. 1B, and FIG. 1C.

Figure 1A:
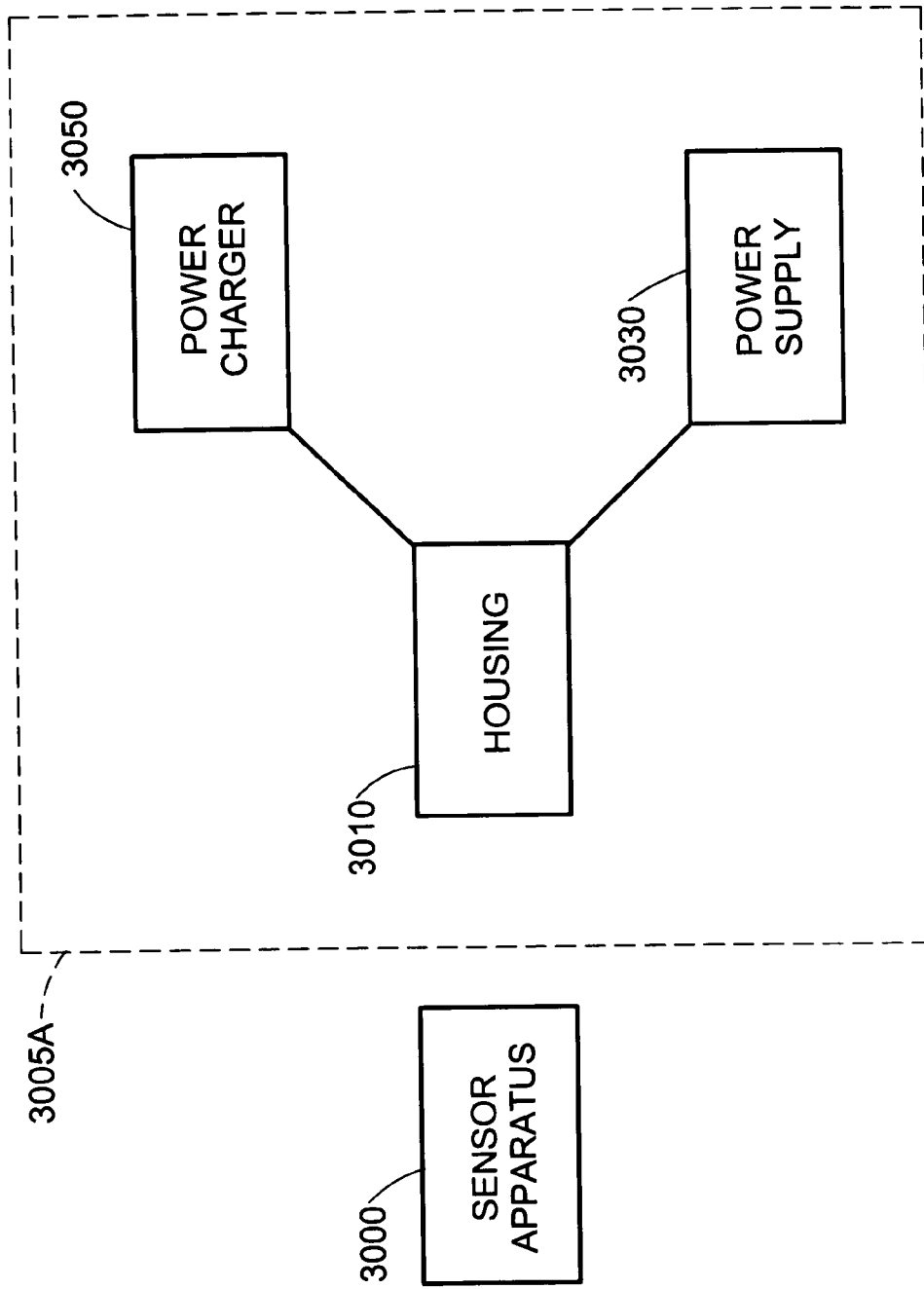
FIG. 1A is a box diagram of an embodiment of the present invention.

Reference is now made to FIG. 1A where there is shown a box diagram illustrating components of another embodiment of the present invention. The diagram in FIG. 1A shows a substantially autonomous sensor apparatus 3000 and a maintenance unit 3005A. Sensor apparatus 3000 is similar to sensor apparatuses described in U.S. Pat. No. 6,691,068; the contents of this reference are incorporated herein in their entirety by this reference.

FIG. 1A shows a physical configuration of components for an embodiment of maintenance unit 3005A that includes a housing 3010, a power supply 3030, and a power charger 3050. The configuration of maintenance unit 3005A shown in FIG. 1A has power supply 3030 and power charger 3050 connected with housing 3010. Preferably, power supply 3030 and power charger 3050 are substantially contained within housing 3010. In a more preferable embodiment, there is an electronics module (electronics module not shown in FIG. 1A) comprising a second housing for substantially containing power supply 3030 and power charger 3050. Alternatively, housing 3010, for some embodiments of the present invention, includes a compartment for substantially containing power supply 3030 and power charger 3050.

Figure 1B:
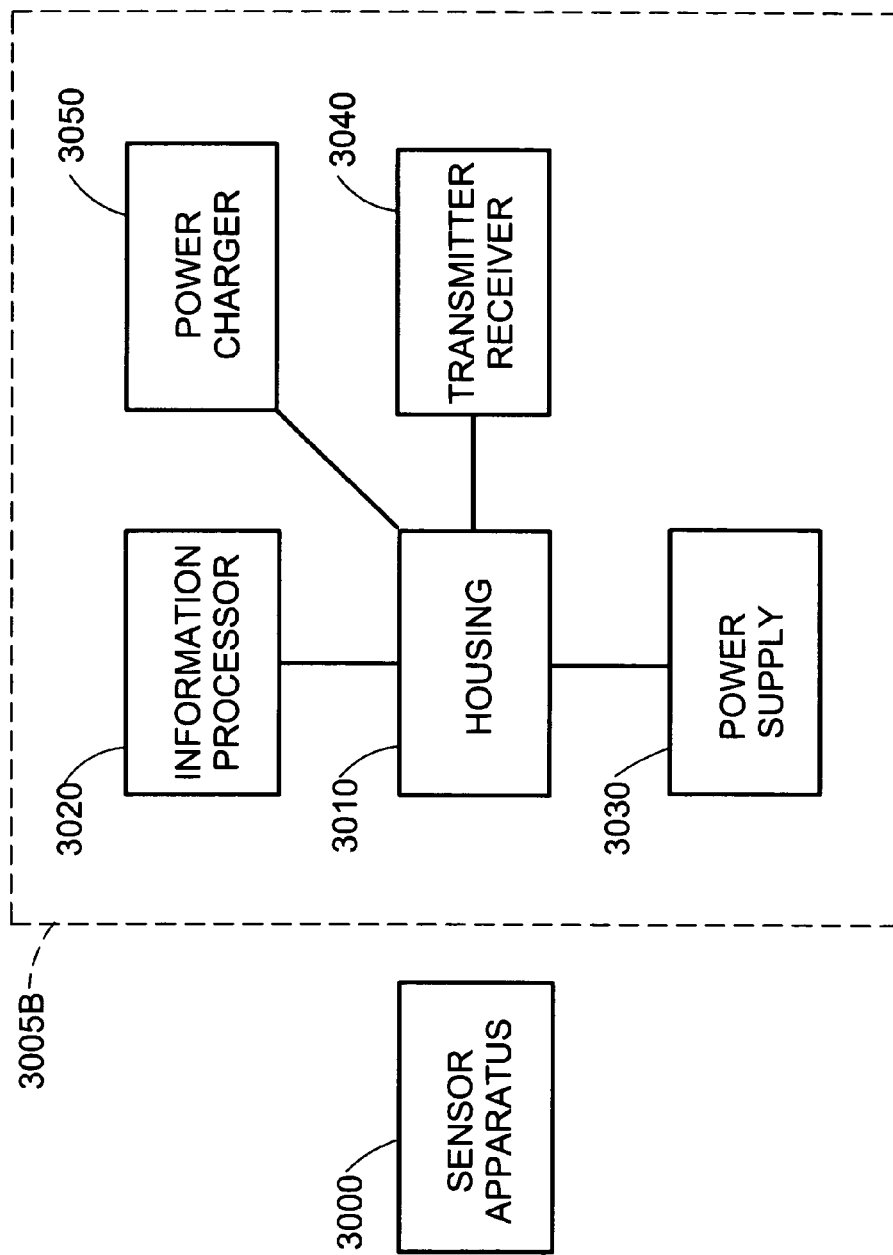
FIG. 1B is a box diagram of an embodiment of the present invention.
Figure 1C:
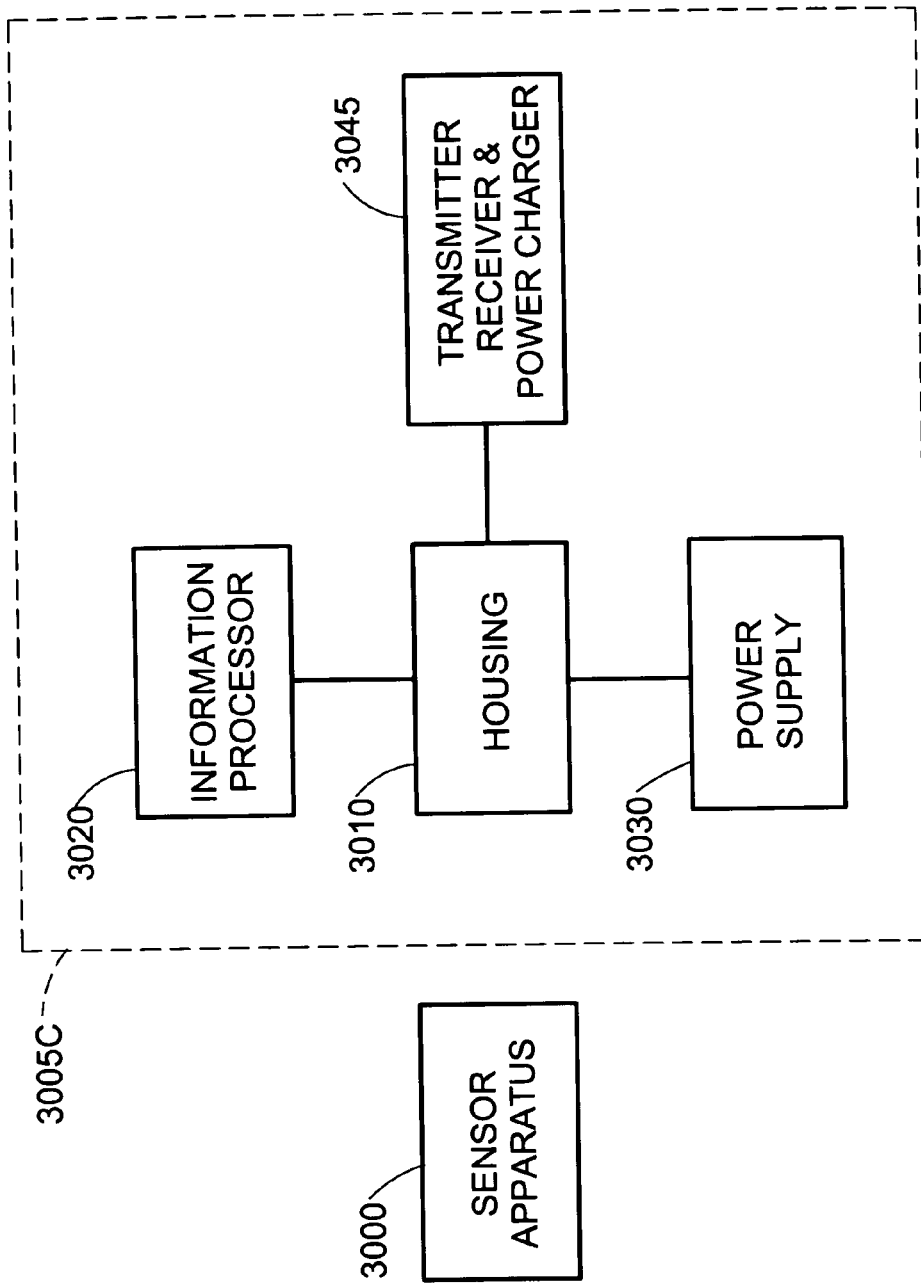
FIG. 1C is a box diagram of an embodiment of the present invention.

FIG. 1B shows a physical configuration of components for another embodiment of a maintenance unit 3005B that includes a housing 3010, an information processor 3020 such as a microprocessor, a computer, an application-specific integrated circuit, or another type of electronic device for processing information and executing commands, a power supply 3030, an information transmitter-receiver 3040, and a power charger 3050. The configuration of maintenance unit 3005B shown in FIG. 1B has information processor 3020, power supply 3030, information transmitter-receiver 3040, and power charger 3050 connected with housing 3010. Preferably, information processor 3020, power supply 3030, information transmitter-receiver 3040, and power charger 3050 are substantially contained within housing 3010. In a more preferable embodiment, there is an electronics module (electronics module not shown in FIG. 1B) comprising a second housing for substantially containing information processor 3020, power supply 3030, information transmitter-receiver 3040, and power charger 3050. Alternatively, housing 3010, for some embodiments of the present invention include a compartment for substantially containing information processor 3020, power supply 3030, information transmitter-receiver 3040, and power charger 3050.

FIG. 1C shows a physical configuration of components for another embodiment of a maintenance unit 3005C that includes a housing 3010, an information processor 3020 such as a microprocessor, a computer, an application-specific integrated circuit, or another type of electronic device for processing information and executing commands, a power supply 3030, an information transmitter-receiver power charger 3045. The configuration of maintenance unit 3005C shown in FIG. 1C has information processor 3020, power supply 3030, and information transmitter-receiver power charger 3045. Preferably, information processor 3020, power supply 3030, and information transmitter-receiver power charger 3045 are substantially contained within housing 3010. In a more preferable embodiment, there is an electronics module (electronics module not shown in FIG. 1C) comprising a second housing for substantially containing information processor 3020, power supply 3030, and information transmitter-receiver power charger 3045. Alternatively, housing 3010, for some embodiments of the present invention, includes a compartment for substantially containing information processor 3020, power supply 3030, and information transmitter-receiver power charger 3045.

Figure 2:
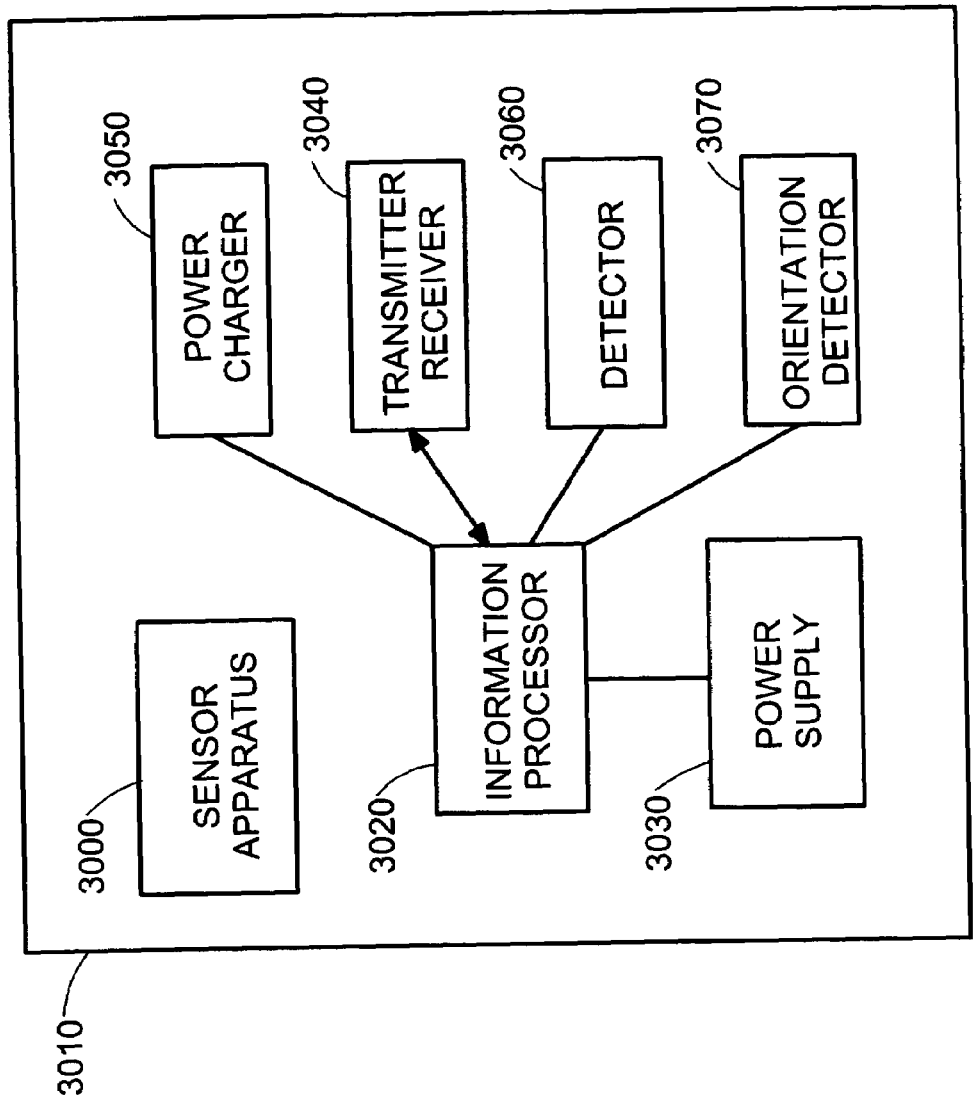
FIG. 2 is a box diagram of an embodiment of the present invention.

Reference is now made to FIG. 2 where there is shown a box diagram illustrating an electrical configuration of components of one embodiment of the present invention. The components shown in FIG. 2 are substantially the same as those presented in the description of FIG. 1. FIG. 2 shows housing 3010 containing sensor apparatus 3000. FIG. 2 also shows housing 3010 containing information processor 3020, power supply 3030, information transmitter-receiver 3040, power charger 3050, sensor apparatus detector 3060, and sensor apparatus orientation detector 3070. Information processor 3020 is connected with power supply 3030 so as to receive power for operation. Information processor 3020 is connected with information transmitter-receiver 3040 so as to provide information transfer with sensor apparatus 3000. Information processor 3020 is connected with power charger 3050 so as to control the charging for the power source in sensor apparatus 3000. Information processor 3020 is connected with sensor apparatus detector 3060 so as to receive information about the presence or absence of sensor apparatus 3000; this allows information processor 3020 to determine when to start or terminate maintenance procedures. Information processor 3020 is connected with sensor apparatus orientation detector 3070 so as to receive information that can be used for determining the orientation of sensor apparatus 3000. The orientation information can be used as described supra.

Figure 3:
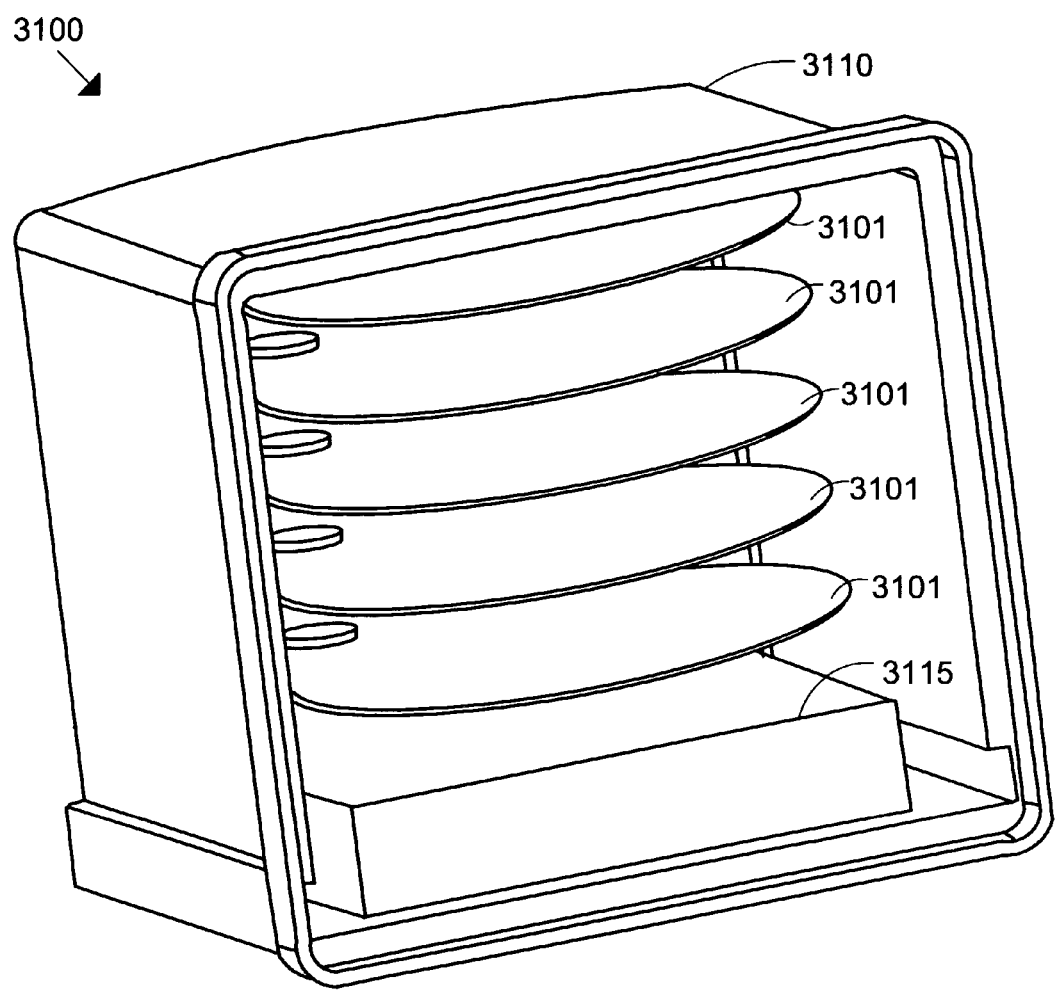
FIG. 3 is a diagram of an embodiment of the present invention.

Reference is now made to FIG. 3 where there is shown a perspective view of a maintenance unit 3100 according to one embodiment of the present invention for maintaining and managing one or more sensor apparatus 3101 held in maintenance unit 3100. Sensor apparatus 3101 shown in FIG. 3 is configured for monitoring a process used for fabricating devices from semiconductor wafers. This means that sensor apparatus 3101 comprises a substantially planar body similar to that of a semiconductor wafer; sensor apparatus 3101 is configured to mimic the properties of a semiconductor wafer so that sensor apparatus 3101 can be used for measuring process conditions for processing a semiconductor wafer. In other words, sensor apparatus 3101 comprises a sensor apparatus for measuring one or more parameters for semiconductor wafer processes. Sensor apparatus 3101 shown in FIG. 3 is substantially the same as some embodiments of sensor wafers described in U.S. Pat. No. 6,691,068. Sensor apparatus 3101 is configured so as to have dimensions similar to those of a semiconductor wafer. Maintenance unit 3100 comprises a housing 3110 and an electronics module 3115.

In a preferred embodiment, housing 3110 has a port so as to allow sensor apparatus 3101 to be loaded and unloaded into and out of housing 3110, respectively. Preferably, housing 3110 also has a door corresponding to the port (door not shown in FIG. 3) so that housing 3110 can be substantially isolated from the surrounding environment. In a still more preferred embodiment, housing 3110 is substantially equivalent to a semiconductor wafer carrying box such as a commonly used standard mechanical interface box or such as a front opening unified pod or such as a standard wafer cassette. In other words, housing 3110 has dimensions that are substantially the same as those used for a standard mechanical interface box or dimensions that are substantially the same as those for a front opening unified pod or a standard wafer cassette. The dimensions are selected to be substantially the same as those for industry compatible workpiece carrying boxes so as to allow sensor apparatus 3101 to be transferred from housing 3110 in substantially the same way as the workpiece, such as a semiconductor wafer, is transferred from a storage box to the process tool. Using the same dimensions also allows for housing 3110 to be interfaced with the process tool in substantially the same way as is done in commercial practice for loading and unloading workpieces, such as semiconductor wafers, into and out of the process tool. In other words, for some embodiments of the present invention, housing 3110 functions mechanically like a housing (such as a front opening unified pod, a standard mechanical interface box, and a wafer cassette) that interfaces with the processing equipment, so that sensor apparatus 3101 can be robotically loaded directly from housing 3110, thereby eliminating manual load/unload procedures.

Industrial wafer carrying boxes such as standard mechanical interface boxes, Front Opening Unified Pods (FOUPs), and standard wafer cassettes are well known to a person of ordinary skill in the art. Details of configurations of some typical wafer carrying boxes are readily available from the technical literature and patent literature. Examples of some wafer carriers can be found in U.S. Pat. No. 6,427,850, U.S. Pat. No. 6,398,032, U.S. Pat. No. 6,186,331, U.S. Pat. No. 4,471,716, and U.S. Pat. No. D479,399; all of these applications are incorporated herein, in their entirety, by this reference.

Unlike the standard technology wafer carrier, the embodiment of the present invention shown in FIG. 3 further includes electronics module 3115 for monitoring and managing sensor apparatus 3101. For preferred embodiments of the present invention, electronics module 3115 is configured so as to include components for one or more of a power supply, a power charging system, wafer presence sensor, a memory bank, and multiple communications systems. It is to be understood that embodiments of the present invention do not require having all of these components, and it is to be understood that embodiments of the present invention are not limited only to these components.

More specifically, various combinations of components may be included in embodiments of the present invention so as to provide a variety of predetermined functions for maintaining and managing sensor apparatus 3101. In a preferred embodiment of the present invention, electronics module 3115 includes at least one of:
  an information processor including executable code for managing and maintaining the sensor apparatus;
  a communication device for information transfer with the sensor apparatus;
  a power source for providing power to the information processor;
  a power charger for providing power to charge the power source for the sensor apparatus;
  a sensor apparatus detector; a sensor apparatus orientation detector;
  an information storage memory for storing at least one of measurement data, calibration coefficients, and commands;
  a connector for receiving power from an external power source such as facility electrical power;
  a second communication device for communication with an external information source; and
  an interface for coupling information to an information display such as a display of light emitting diodes and such as a liquid crystal display.

In a more preferred embodiment, electronics module 3115 includes more than one of the elements just listed.

The elements included in electronics module 3115 are included so as to provide preferred functionality for some embodiments of maintenance unit 3100. For one embodiment, the elements comprising electronics module 3115 are configured so that electronics module 3115 is capable of automatically detecting one or more sensor apparatus 3101 if present in housing 3110. If electronics module 3115 detects the presence of sensor apparatus 3101, then electronics module 3115 establishes wireless communication with sensor apparatus 3101 via the communication device for information transfer with the sensor apparatus 3101. Once communications are established, sensor apparatus 3101 determines the appropriate level of battery charging current, for rechargeable battery powered sensor apparatus 3101, which should be delivered to each of the one or more sensor apparatus 3101, and activates the power charging system accordingly. Electronics module 3115 also checks to see if new sensor data are present in the memory of sensor apparatus 3101, and if so, begins to download these data to the information storage memory of electronics module 3115. Preferably, all of these actions occur automatically, so that no operator intervention is necessary. The actions can be carried out in response to commands from the information processor of electronics module 3115.

In further operation, a separate "base station" or "data server" computer (not shown in FIG. 3) may be provided and configured to establish external communications with electronics module 3115, via the second communication device for communication with an external information source, to query the status of electronics module 3115 and/or the one or more sensor apparatus 3101 inside maintenance unit 3100. The contents of the information storage memory of maintenance unit 3100 can be queried, and the data from any of the one or more sensor apparatus 3101 can be retrieved for analysis or external storage.

Instructions, commands, and/or parameters to be used by sensor apparatus 3101 can be uploaded to electronics module 3115 for immediate or delayed running on processing equipment. Further, these instructions, commands, and/or parameters can be set up so that they automatically start running when electronics module 3115 detects that the robotics are about to removed sensor apparatus 3101 from housing 3110.

In addition to these "basic" operations, some embodiments of the present invention include capabilities for more advanced actions that can be performed. For example, electronics module 3115 can automatically test the battery capacity of the one or more sensor apparatus 3101 by running a "test" sequence. For a battery powered sensor apparatus, the battery capacity can change as a function of how much usage, particularly at high temperature, the battery has experienced over its lifetime. In a preferred embodiment, electronics module 3115 is configured to include a database of information for all sensor apparatus 3101 maintained by maintenance unit 3100 for historical logging so as to allow actions such as verification that each battery of the sensor apparatus has enough power capacity for the next data collection run.

With a continuous wireless communications link to the data server computer, maintenance unit 3100 can be in continuous communication with a workpiece processing facility, such as an electronic device fabrication facility, also known as a fab. When new measurement data from sensor apparatus 3101 become available, the data are downloaded to electronics module 3115 of maintenance unit 3100. The data can be wirelessly sent to the data server computer for analysis. Maintenance unit 3100 can also be connected to a fab's central Factory Automation (FA) server, which would allow automated control of data measurements performed using sensor apparatus 3101.

Some embodiments of the present invention enable a fully automated metrology system for processing workpieces. More specifically, a process tool can communicate its need for calibration to the central Factory Automation server, which would then send a maintenance unit according to embodiments of the present invention, such as a maintenance unit configured substantially the same as a front opening unified pod (FOUP) for holding 300 mm semiconductor wafers, from a storage facility to the process tool using FOUP handling robotics. The Factory Automation server would then instruct the maintenance unit (through the Factory Automation link) to prepare a sensor apparatus for a data collection mission specific to that process tool, and start the mission. The tool would then load the sensor apparatus into itself, process the sensor apparatus using the recipe of interest, and then transfer the sensor apparatus back to the maintenance unit. At this point, the maintenance unit would begin recharging the sensor apparatus power supply as well as downloading the newly collected data. Once this data is ready, the maintenance unit can contact the data server and send the data to the data server for analysis such as extraction of new calibration coefficients, for example. When these new coefficients are available, the new coefficients can be sent back to the Factory Automation system, which will relay them back to the tool. The tool can then implement the new coefficients to provide optimal performance. In the meantime, the Factory Automation system can transfer the maintenance unit back to the storage facility in preparation for the next event.

Preferred embodiments of the maintenance unit are configured so that the charging system and the communications system are independent of the orientation of the sensor apparatus. In addition, the maintenance unit is configured so as to be physically compatible with standard tool front-end interfaces so that the maintenance unit can be transported by standard transport systems such as transport systems for standard wafer cassettes, standard mechanical interface boxes, and standard front opening uniform pods.

Typical sensor apparatus recharging systems use either a set of contact points for direct application of voltage/current to the sensor apparatus, or to a localized region of the sensor apparatus for alignment with a wireless recharging system, such as an inductive coil. Both of these systems, by their nature, require a specific alignment of the sensor wafer with respect to the charging system. Because of the orientation-independence that is preferred for embodiments of the maintenance units taught herein, these limitations have been eliminated.

One method for overcoming these limitations is to place the charging system (either the contacts or the inductive coil) at the center of the wafer. In this case, the center of the wafer is always in a predictable location, and does not move if the wafer is rotated. However, the center portion of the sensor apparatus may be an important location for the placement of sensors. Although this configuration may be satisfactory for some embodiments of the present invention, a more preferred embodiment includes a configuration that includes having the charging system placed off-center of the sensor apparatus.

For contact charging systems, a more preferred embodiment of the present invention includes a ring-contact system. In one configuration, the ring contact system includes having a pair of concentric ring electrical contacts on the sensor apparatus that correspond to a pair of electrical contacts disposed in the housing of the maintenance unit so as to make contact with one of the rings, respectively. In another embodiment, a ring of contacts are placed around the maintenance unit so that the range of contacts slide into contact with charging contacts of the sensor apparatus when the sensor apparatus is fully inserted into the maintenance unit. In this way, contact will always be made, regardless of the orientation of the sensor apparatus.

Because physical contact with the sensor apparatus is a potential particle generator, wireless recharging schemes are preferred for some sensor apparatus applications such as for electronic device fabrication. In this case, a still more preferred embodiment of the present invention includes a novel system for inductively transferring power from the maintenance unit to the sensor apparatus.

Figure 4:
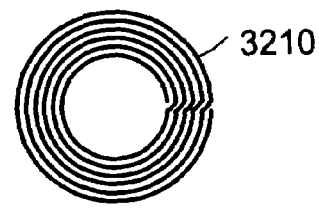
FIG. 4 is a diagram of a coil for an embodiment of the present invention.
Figure 5:
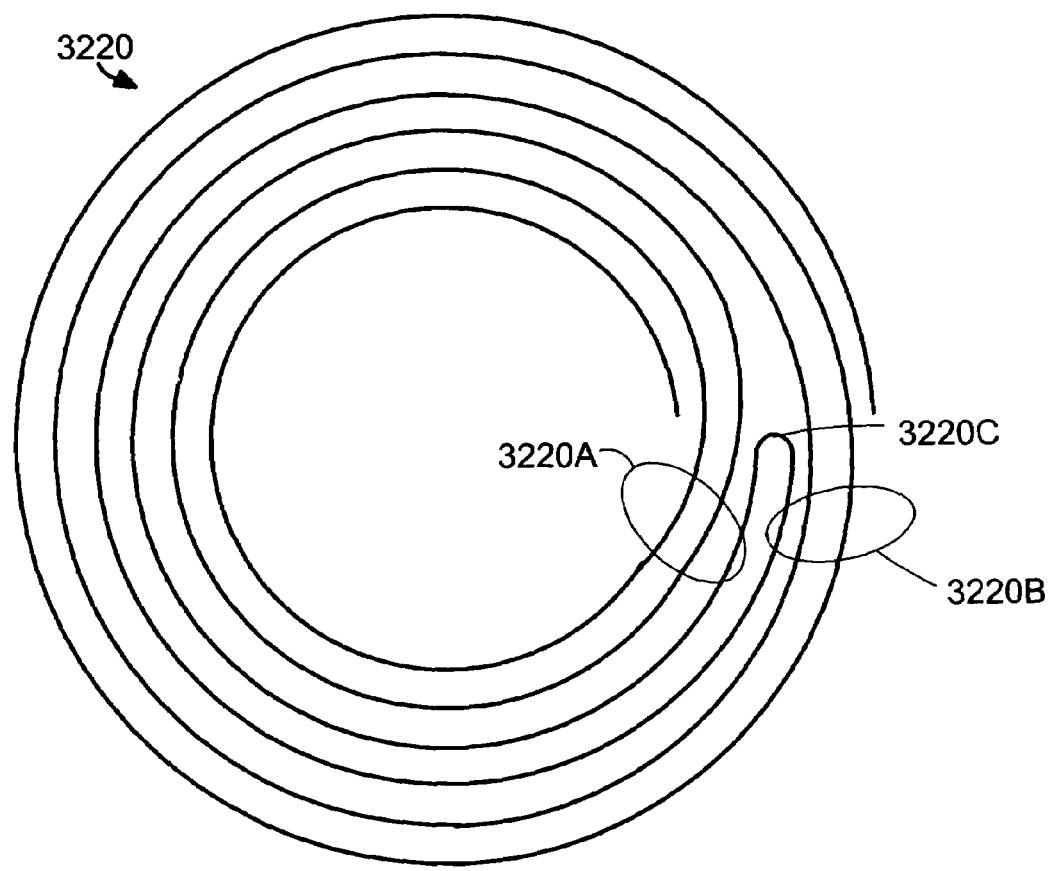
FIG. 5 is a diagram of a coil for an embodiment of the present invention.
Figure 6:
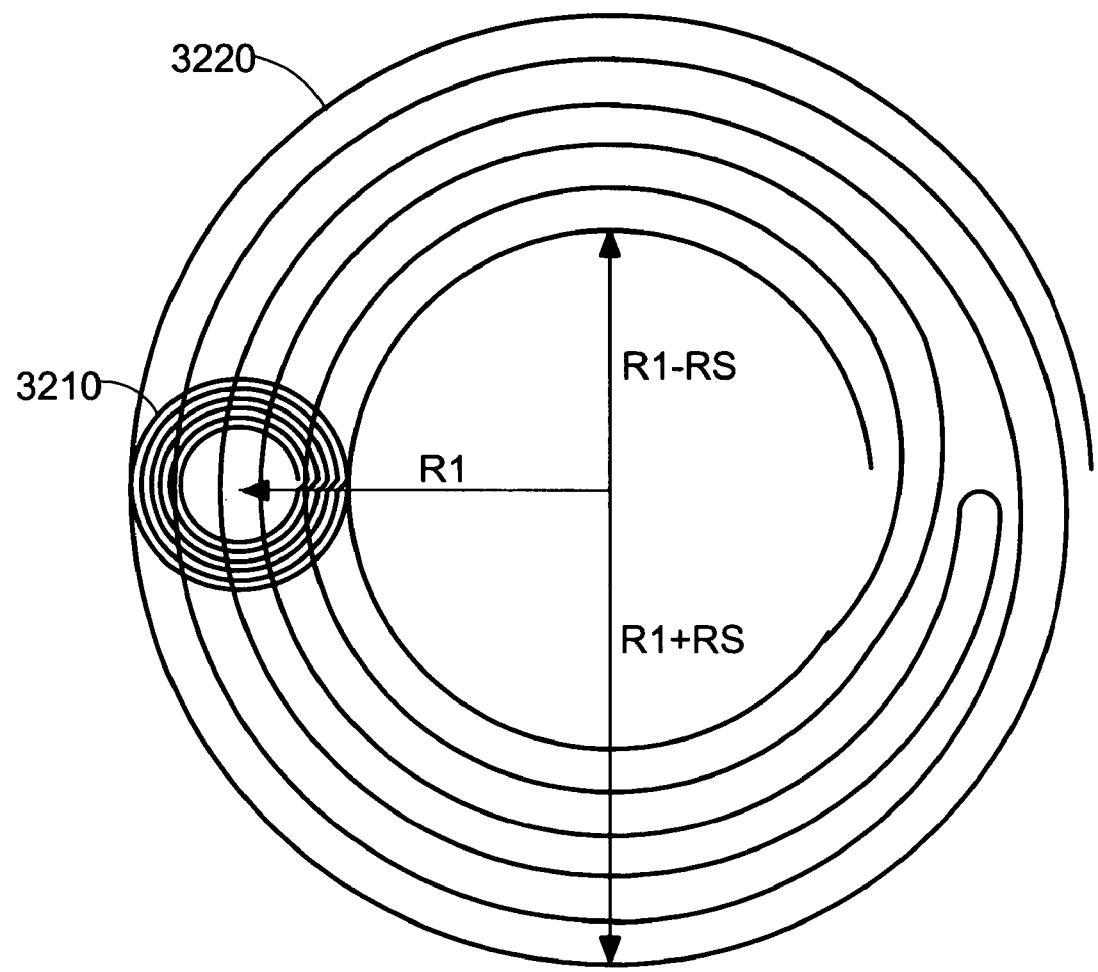
FIG. 6 is a diagram of an arrangement of coils for the operation of an embodiment of the present invention.

A charging system according to an embodiment of the present invention will be presented next with reference to FIG. 1, FIG. 3., FIG. 4, FIG. 5, and FIG. 6. The charging system is configured to allow the onboard power supply such as that of sensor apparatus 3000 and sensor apparatus 3101 to be charged or recharged. For preferred embodiments, the onboard power supply for the sensor apparatus comprises a battery; however, another type of power supply may be used. The basic principles of inductively coupling electrical power from a power resource to a power receiver are well known to those of ordinary skill in the art.

The power charging system according to one embodiment of the present invention includes a conductive material induction coil such as a planar multiturn induction coil having concentric coil turns such as sensor apparatus induction coil 3210 shown in FIG. 4. Induction coils are well known in the art; substantially any standard induction coil can be used for induction coil 3210. Sensor apparatus induction coil 3210 is connected with sensor apparatus 3101. Optionally, sensor apparatus induction coil 3210 may be disposed upon a surface of sensor apparatus 3101 or within the interior of sensor apparatus 3101. More specifically, sensor apparatus induction coil 3210 behaves as a pickup coil that is connected with other electrical components of sensor apparatus 3101 so that power coupled to sensor apparatus induction coil 3210 can be provided to the onboard power supply of sensor apparatus 3101. The other electrical components of sensor apparatus 3101 that are connected with sensor apparatus induction coil 3210 include rectification components and circuitry capable of producing a DC current from AC currents induced in sensor apparatus induction coil 3210. The DC current is used to charge the battery or other power source and, as another option, to also power electrically active components incorporated in sensor apparatus 3101. In a preferred embodiment, sensor apparatus induction coil 3210 coil and electrically active component(s) connected with sensor apparatus induction coil 3210 are completely enclosed within chemically and electrically inert materials and/or shielding components.

The charging system also includes a maintenance unit induction coil such as maintenance unit induction coil 3220 shown in FIG. 5. Maintenance unit induction coil 3220 includes one or more loops of a conductive material and serves as a drive coil for the sensor apparatus induction coil. As is typical for a power charger, the charging system further includes having maintenance unit induction coil 3220 connected to components and circuitry capable of producing an AC current flow within maintenance unit induction coil 3220. The components and circuitry capable of producing the AC current flow within maintenance unit induction coil 3220, preferably, are contained as part of electronics module 3115, for the embodiment shown in FIG. 3. Maintenance unit induction coil 3220 is preferably disposed in housing 3010 so as be able to induce AC current flow in sensor apparatus induction coil 3210 substantially without physical contact with the sensor apparatus. Furthermore, maintenance unit induction coil 3220 is preferably disposed in housing 3010 so as to be compatible with automated transport of the sensor apparatus.

The operation of a charging system according to one embodiment of the present invention can be understood by comparison to a standard electrical transformer. In a normal power transformer, there are two coils, a primary coil through which AC currents are driven, and a secondary coil in which AC currents are induced. These two coils are linked through magnetic induction by either being formed around a common axis (coaxial configuration) or being formed around a common magnetic core element. The ratio of the number of turns between the two coils establishes the relationship between the voltages and currents in each coil. The conductor properties (diameter, material, insulation, etc.) and the core material (e.g. air, iron, etc.) determine the operational power and frequency ranges. Transformer theory, design, and application are well-established technologies and widely utilized.

The use of an "open transformer" (i.e. one in which the primary and secondary coils are separated by a significant gap) is a well-established technique for coupling power through a non-conducting material. The use of mechanically independent primary and secondary coils is similarly a well-known method for powering movable objects. Systems using this "open transformer" method of power coupling generally require that the primary and secondary coils be carefully aligned with respect to one another. It is well understood that the magnetic field generated by a primary coil falls off rapidly with distance—relative displacement either along the axis of the coils or laterally will greatly reduce coupling to a secondary coil.

Many semiconductor processing systems that use automated wafer handling mechanisms do not preserve the rotational alignment of the wafers or wafer-like sensor apparatus as they are transported and processed. Thus, the rotational alignment of a sensor apparatus can be undefined as it enters a maintenance unit. This uncertainty in rotational alignment could be an impediment to the use of sensor apparatus technology like that described in U.S. Pat. No. 6,691,068. The ability to effectively couple power to a wafer-like sensor apparatus, without requiring a specific rotational orientation, is an enabling capability for use of the sensor apparatus technology in highly automated processing equipment. It is a specific feature of some embodiments of the present invention that rotational alignment between a sensor apparatus induction coil and a maintenance unit induction coil is not required for coupling power therebetween.

Some embodiments of the present invention allow power to be coupled to a sensor apparatus such as autonomous sensor apparatus 3000 from a stationary charging station such as power charger 3050 described with reference to FIG. 1. This power coupling is independent of the rotational orientation of the wafer within the charging station. In a preferred embodiment of the present invention, the orientation independent power coupling is achieved as a result of the design of the sensor apparatus induction coil and the design of the maintenance unit induction coil.

More specifically for one embodiment, sensor apparatus induction coil 3210 is located on sensor apparatus 3101. For semiconductor wafer processing applications, sensor apparatus 3101 may comprise a semiconductor wafer that is 200 mm or 300 mm in diameter. Sensor apparatus induction coil 3210 is typically a relatively small planar coil, e.g., 25.4 mm diameter, located on the surface of the wafer. The dimensions of sensor apparatus induction coil 3210, both diameter and thickness, are minimized in order to reduce the impact on both the measurements being made and the process conditions from the presence of sensor apparatus induction coil 3210. The radius of sensor apparatus induction coil 3210 is designated Rs. The center of sensor apparatus induction coil 3210 is positioned at radius R1 with respect to the center of the wafer.

Maintenance unit induction coil 3220 is located in maintenance unit 3005 or maintenance unit 3100, FIG. 1 and FIG. 2, respectively. Alternatively, for some embodiments maintenance unit coil 3220 may be located outside of the housing the maintenance unit; for instance, attached to the outside of a surface of the housing. Maintenance unit induction coil 3220, as shown in FIG. 5, comprises two connected coaxial coils 3220A and 3220B. These coils have a common center point; the coils are disposed within maintenance unit 3100 so that the center point is located so as to correspond with the center of sensor apparatus 3101 when a sensor apparatus 3101 is present in maintenance unit 3100. As illustrated in FIG. 6, the radius of the inner most coil of this pair is R1−Rs and the radius of the outermost coil of this pair is R1+Rs. The two coils are connected at 3220C, as shown in FIG. 5, so that the current flows in opposite directions in the two coils. That is, if the outer coil is wound in a clockwise direction, the inner coil is wound in a counterclockwise direction and vice versa.

In operation, sensor apparatus induction coil 3210 is positioned so that its center is located on a radius midway between the coil turns of the maintenance unit induction coil 3220, as shown in FIG. 6. In other words, the center of sensor apparatus induction coil 3220 is located between the outer coil turn of coil 3220A and the inner coil turn of 3220B. This means that sensor apparatus induction coil 3210 will thus be tangential to maintenance unit induction coil 3220 at two points. Counter circulating currents within maintenance unit induction coil 3220 will thus produce an additive, unidirectional current within sensor apparatus induction coil 3210.

While the center of sensor apparatus 3101 must be positioned to coincide with the center of maintenance unit induction coil 3220 for good coupling, the rotational orientation of sensor apparatus 3101 is unimportant. Any rotation of sensor apparatus 3101 will maintain a desired power coupling relationship between sensor apparatus induction coil 3210 and maintenance unit induction coil 3220.

Specific embodiments of the charging system according to present invention require that a number of design parameters be specified. Some of these design parameters are:

a. turns ratio—the ratio of turns between the maintenance unit induction coil and the sensor apparatus induction coil;

b. primary voltage—voltage applied across the maintenance unit induction coil;

c. drive frequency—the AC frequency of the primary voltage; and d. coil-to-coil separation—coaxial distance between coil planes.

It would be obvious to one knowledgeable in the field of transformers and power supply design to optimize these parameters based upon the power requirements of a specific application. Embodiments of the present invention pertain to the specific arrangement of primary and secondary coils of an open transformer power coupling method by which the power coupling is made insensitive to rotational misalignment.

For some embodiments of the present invention, the maintenance unit coil, also referred to as the primary coil, has an outside radius in the range from about 1 cm to about 9 cm and all ranges subsumed therein and the number of turns of the primary coil is in the range from about 3 to about 30 turns and all ranges subsumed therein. Optionally, the power charger is configured so as to provide to the primary coil a primary voltage in the range from about 3 volts to about 18 volts and all ranges subsumed therein at a primary frequency in the range from about 0.1 MHz to about 4 MHz and all ranges subsumed therein. The power charger may be configured so as to provide to the primary coil a driving frequency that is a resonant frequency of the primary coil or a sub harmonic frequency of the primary coil. The power charger may be configured so as to drive the sensor apparatus coil, also referred to as the secondary coil, at a resonant frequency or sub harmonic frequency of the secondary coil.

Figure 7:
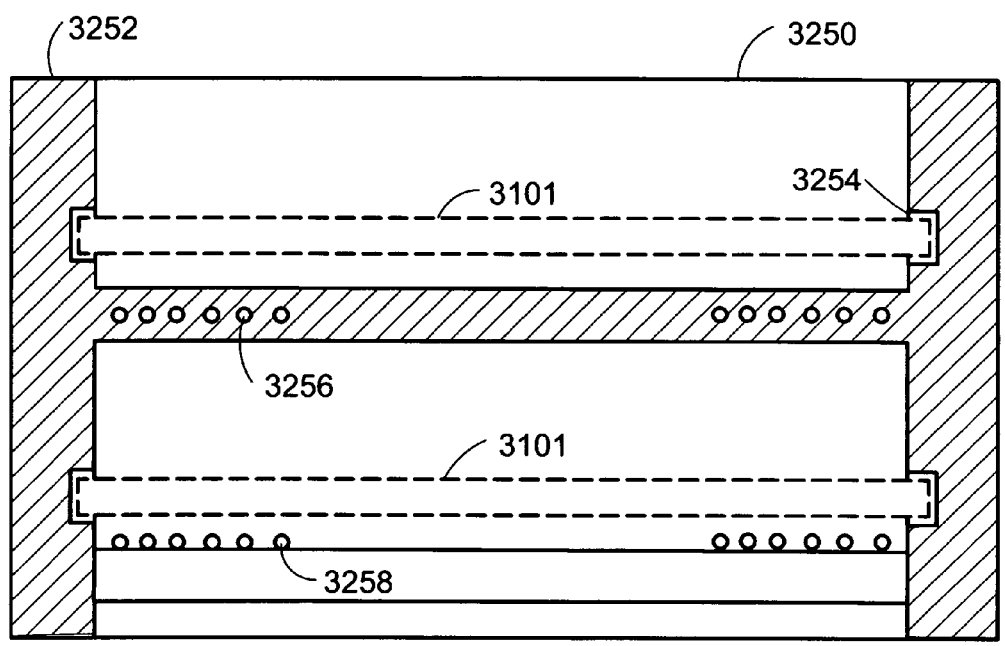
FIG. 7 is a diagram of an embodiment of the present invention.

Reference is now made to FIG. 7 where there is shown a side view of a maintenance unit portion 3252 according to one embodiment of the present invention; FIG. 7 shows maintenance unit portion 3252 containing two sensor apparatuses 3101. The maintenance unit partially illustrated in FIG. 7 has characteristics that are substantially the same for corresponding parts of maintenance unit 3100 shown in FIG. 3. FIG. 7 gives further details about how sensor apparatus 3101 may be held in the housing; the sensor apparatus may be held in slots 3254 formed in the walls of the housing. FIG. 7 illustrates an example of the relative positions of sensor apparatus 3101 with respect to the maintenance unit induction coils. Maintenance unit induction coils 3256, shown in cross section in FIG. 7, may be embedded in the walls of the maintenance unit. Alternatively, maintenance unit induction coils 3258 may be located on the surface of one of the walls of the maintenance unit, also shown in FIG. 7.

In view of the present disclosure, a wide variety of embodiments of the charging system taught herein can be produced by one of ordinary skill in the art. As examples, some additional embodiments of the present invention are described as follows:

1. A method for coupling electrical power between separable objects wherein the power coupling is independent of the rotational alignment of the objects.

2. The method of embodiment 1, wherein one of the separable objects is a relatively stationary charging station and a second object comprises a sensor apparatus.

3. The method of embodiment 2, wherein the sensor apparatus contains one or more inductive pickup (secondary) coils, the secondary coil(s) being positioned at a specific radius with respect to the sensor apparatus center, the charging station contains 2 or more inductive charging (primary) coils, the primary coils being positioned coaxially with respect to each other, the primary coils having a difference in radii approximating the radius of the secondary coil, the primary coils being electrically interconnected in such a way that current flows in opposite directions in adjacent coils, and the secondary coil(s) being positioned at a distance from the center of the sensor apparatus corresponding to the midpoint of the primary coil radii.

4. An apparatus utilizing the method of embodiment 3, wherein the secondary coil(s) have a radius between 1 and 15 cm, the secondary coil(s) have between 3 and 30 turns, and the secondary coils(s) are centered at a radius between 0 and 8 cm for a 200 mm diameter silicon wafer.

5. An apparatus utilizing the method of embodiment 3, wherein the secondary coil provides an input to a rectification circuit.
6. The apparatus of embodiment 5, wherein the rectification circuit is a voltage doubling circuit.
7. The apparatus of embodiment 5, wherein the secondary coil is driven at a resonant or sub harmonic frequency.
8. An apparatus utilizing the method of embodiment 3, wherein the primary coils have a radii of between 1 and 9 cm and the primary coils have between 3 and 30 turns.
9. An apparatus utilizing the method of embodiment 3, wherein the primary voltage is between 3 and 18 volts and the primary frequency is between 0.1 and 4 MHz.
10. The apparatus of embodiment 9, wherein the primary driving frequency is a resonant or sub harmonic frequency of the primary coil.

Contact communications schemes use a physical electrical contact to the sensor apparatus to transmit data, and therefore, preferred embodiments of the present invention share the same requirements and solution methodologies as the wireless recharging system described above.

However, for the same reasons as for the recharging systems, wireless communications are incorporated in preferred embodiments of the present invention. Some types of these wireless communication systems, such as infrared communication systems, are also directional. For example, embodiments of the present invention that include infrared communications systems require that the external transmitter/receiver be closely aligned with the sensor apparatus transmitter and receiver for good communication. In these cases, one embodiment of the present invention includes multiple infrared transceivers disposed inside the housing of the maintenance unit, and positioned in an annular ring. In this way, no matter at which orientation the sensor apparatus is placed in the maintenance unit housing, one of the transceivers will be pointing at the sensor apparatus transceiver. Alternatively, for another embodiment of the present invention, the maintenance unit includes a set of prisms disposed within the housing of the maintenance unit so as to redirect the infrared light toward a central transceiver for the maintenance unit from any sensor apparatus rotational position. Some embodiments of the present invention include components for omni-directional RF communications so as to provide another way to avoid the directionality problems described above.

However, for a typical sensor apparatus, where power conservation is a primary concern, typical RF communications systems draw too much power for some applications. In these cases, a more preferred embodiment of the present invention includes components for a novel "through-the-coil" communications system.

Figure 8:
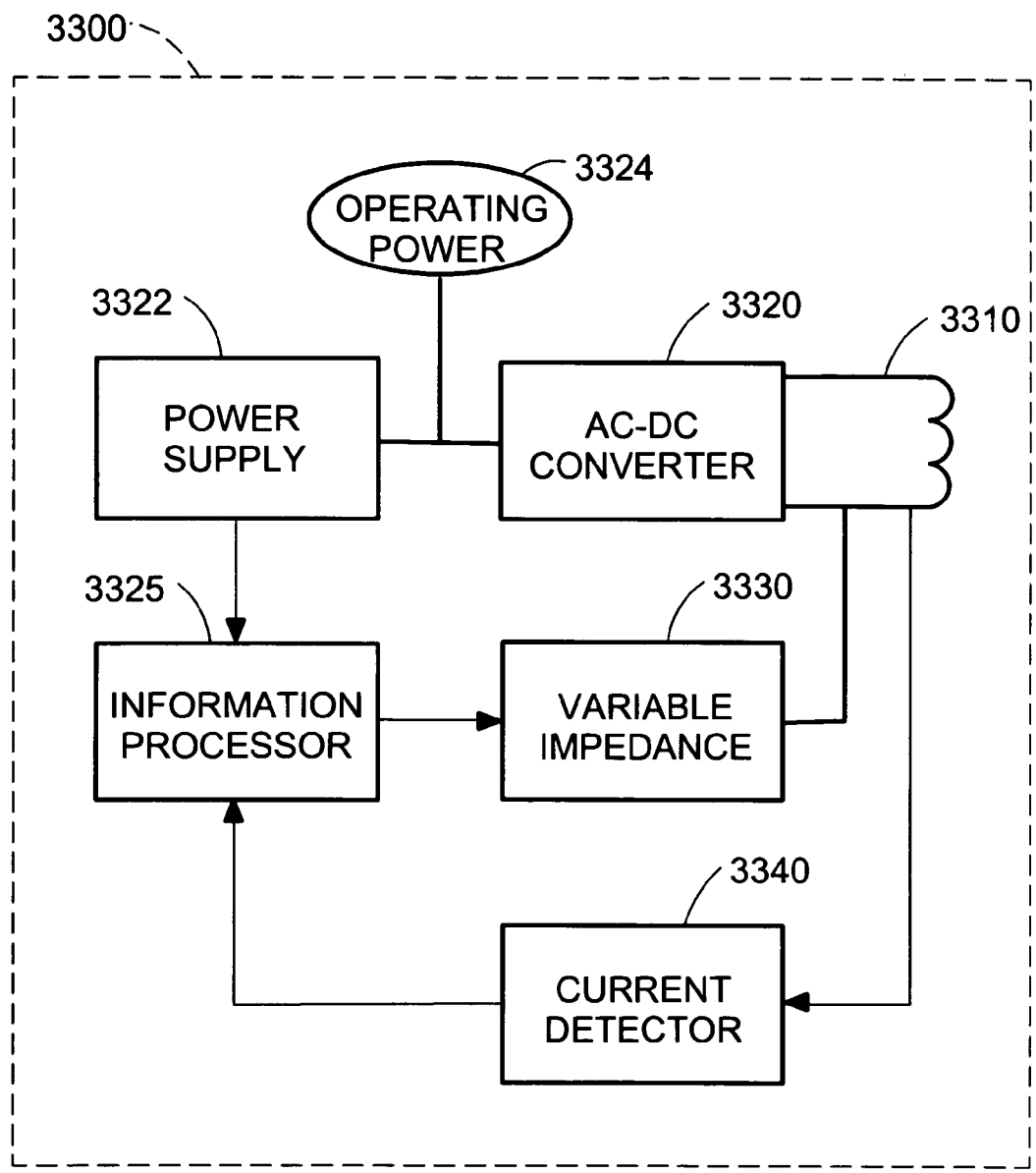
FIG. 8 is a diagram of an embodiment of the present invention.
Figure 9:
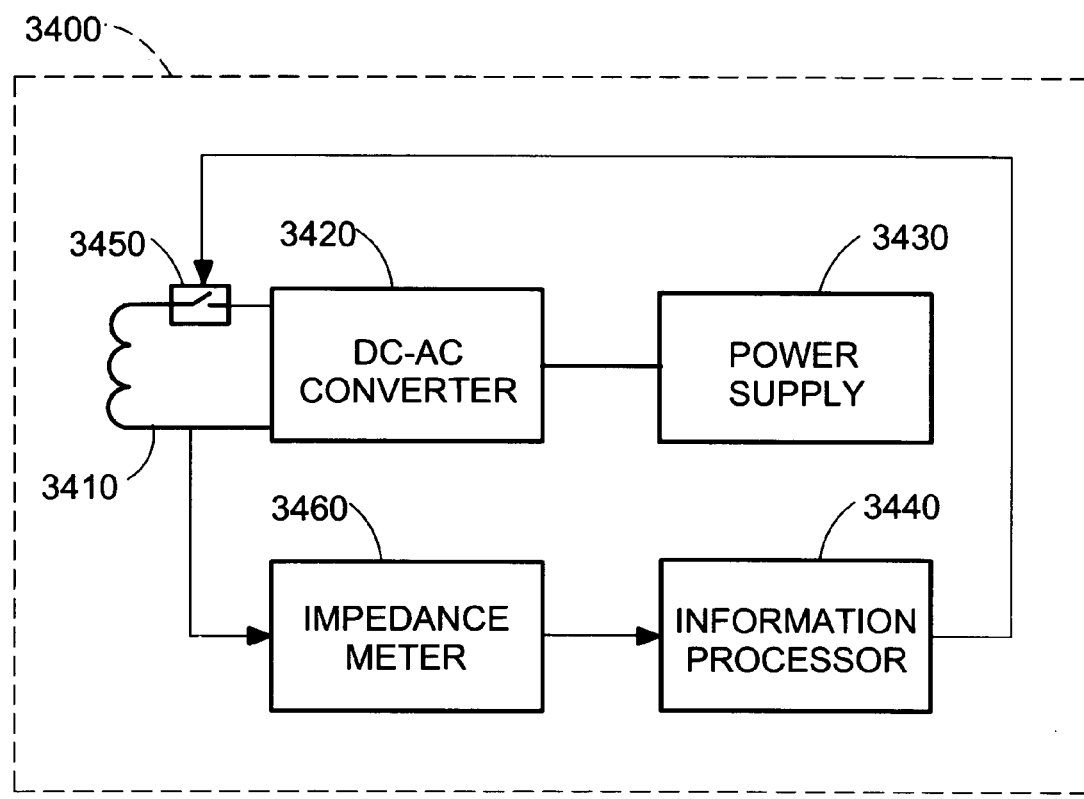
FIG. 9 is a diagram of an embodiment of the present invention.

A through the coil communications system according to one embodiment of the present invention will now be described with reference to FIG. 8 and FIG. 9. For this example embodiment of the present invention, FIG. 8 shows components 3300 for communication and for receiving the power used for charging a power supply. FIG. 9 shows components 3400 for communication with the components shown in FIG. 8 and for transmitting the power received by the components in FIG. 8 for charging the power supply. In other words, components 3300 shown in FIG. 8 communicate with components 3400 shown in FIG. 9; components 3400 shown in FIG. 9 inductively couple power to the components shown in FIG. 8 so that the power supply for the components shown in FIG. 8 can be charged. For the application of charging a sensor apparatus using a sensor apparatus maintenance unit, components 3300 shown in FIG. 8 would be included in the sensor apparatus for charging the sensor apparatus power supply. Components 3400 shown in FIG. 9 would be included in the power charger for the sensor apparatus maintenance unit.

Components 3300 include a sensor apparatus induction coil 3310 connected with an AC-DC converter 3320 so that alternating currents induced in coil 3310 can be provided to converter 3320 to produce a DC current output. Components 3300 also include a power supply 3322. Power supply 3322 is connected with converter 3320 to receive DC current output from converter 3320 so that power supply 3322 can be charged or recharged. Optionally, the DC current output from converter 3320 may be divided so that part of the current goes to power supply 3322 and the remaining current may be diverted to provide operating power 3324 for the sensor apparatus. In other words, converter 3320 may be connected to the power bus for the sensor apparatus for operating the electrically active components of the sensor apparatus.

Components 3300 also include an information processor 3325. Information processor 3325 may be an information processor such as a microprocessor, a computer, an application-specific integrated circuit, or another type of electronic device for processing information and executing commands. Power supply 3322 and information processor 3325 are connected so that one or more characteristics indicating the status of power supply 3322 can be provided to information processor 3325. Characteristics indicating the status of power supply 3322 may include characteristics such as the level of discharge of the power supply and such as characteristics for determining the voltage and current that should be used for charging the power supply.

Components 3300 further include a variable impedance 3330 such as a circuit capable of rapidly varying the impedance of sensor apparatus induction coil 3310. Variable impedance 3330 is configured so that the impedance can be varied in response to commands from information processor 3325. Variable impedance 3330 is connected with information processor 3325 so as receive commands from information processor 3325. Variable impedance 3330 is connected with sensor apparatus induction coil 3310 so that the impedance of sensor apparatus induction coil 3310 is changed by changes in the impedance of variable impedance 3330.

Components 3300 also include a current detector 3340 connected with sensor apparatus induction coil 3310 for detecting the presence or absence of current flow within sensor apparatus induction coil 3310. Current detector 3340 may comprise a circuit for detecting currents such as that used in a current pickup. Current detector 3340 is connected with information processor 3325 so as to provide information to information processor 3325 about the presence or absence of currents in sensor apparatus induction coil 3310. It is to be understood that detecting current is but one method that may be used for monitoring the status of the coil; of course other characteristics of the coil that result from the presence of inductively coupled cower can be used and will be obvious to one of ordinary skill in the art, in view of the present disclosure.

Components 3400 include a maintenance unit coil 3410 and a DC-AC converter 3420 connected so that converter 3420 can apply AC current to maintenance unit coil 3410 for inductively coupling power to sensor apparatus induction coil 3310. In other words, converter 3420 functions as a driver circuit capable of producing an alternating current flow within maintenance unit coil 3410. FIG. 9 shows a power supply 3430 connected to provide power to converter

3420. This configuration represents a preferred embodiment for which the maintenance unit has an independent DC power supply such as a battery. However, it is to be understood that other configurations can be used such as having the maintenance unit connected to an external power resource that may not be a DC power source. In one embodiment, the maintenance unit may be configured to receive facility electrical power as the external power resource.

Components 3400 also include an information processor 3440 such as a microprocessor, a computer, an application-specific integrated circuit, or another type of electronic device for processing information and executing commands, a switch 3450, and an impedance meter 3460. Impedance meter 3460 is connected with maintenance unit coil 3410 and information processor 3440 so as to provide measurements of impedance of maintenance unit coil 3410 as input information to information processor 3440. Information processor 3440 is connected with switch 3450 so as to control the opening and closing of switch 3450; this configuration provides a circuit capable of rapidly turning maintenance unit induction coil 3410 power output on and off. Of course, the embodiment shown in FIG. 9 for controlling the current flow through maintenance unit induction coil 3410 is provided only as an illustration; a wide variety of hardware configurations can be used to produce essentially the same result. For instance, information processor 3440 may be connected with converter 3420 to control the current output by converter 3420. A desired result of the configuration is to allow information processor 3440 to control the power output of maintenance unit induction coil 3410 in response to measurements of the impedance from impedance meter 3460. In other words, the configuration is designed so as to provide a circuit capable of measuring the time dependent impedance (loading) of maintenance unit induction coil 3410.

An example of a method by which components 3300 and components 3400 are able to both communicate while allowing charging of power supply 3322, according to one embodiment of the present invention, can be illustrated using the following sequence of operations with reference to FIG. 8 and FIG. 9. For the following example, it is to be understood that components 3300 shown in FIG. 8 are incorporated in a sensor apparatus as described supra and the components 3400 shown in FIG. 9 are incorporated in a maintenance unit as described supra.

Maintenance unit coil 3410 is driven (AC current applied) in a predetermined "wake-up" pattern of ON states, taken in this case as current flowing, and OFF states, taken in this case as no current flow. For this embodiment, the "wake-up" pattern includes a number of rapid ON-OFF pulses followed by a longer period in the ON state. Optionally, the "wake-up" pattern is initiated either at periodic time intervals or in response to an external signal that a sensor apparatus is present in the maintenance unit. The "wake-up" pattern will induce AC current pulses within a properly positioned sensor apparatus induction coil 3310.

The action of converter 3320 will produce a DC current from the AC current induced in coil 3310 from coil 3410. Preferably, the magnitude of the DC current is capable of both charging power supply 3322 as well as directly providing operating power 3324 for powering the sensor apparatus.

Current detector 3340 detects the current in sensor apparatus induction coil 3310 and produces a set of digital pulses corresponding to the "wake-up" pattern. The digital pulses are provided as an input to information processor 3325 within the sensor apparatus. If the digital pulse pattern is recognized by information processor 3325 as a valid "wake-up" pattern, information processor 3325 will wait for the time when the current flow within sensor apparatus induction coil 3310 is constantly ON. When a constant ON period is determined, the information processor will activate variable impedance 3330 so as to cause impedance variations on sensor apparatus induction coil 3310. The impedance variations may include a pattern of high and low impedance states corresponding to a preprogrammed "awake" pattern or to some other predetermined recognizable pattern.

During the constant ON period, impedance meter 3460 detects the changes in the loading of maintenance unit induction coil 3410 caused by the varying impedance of sensor apparatus induction coil 3310. Information about the changes in impedance is provided as a digital input to information processor 3440. If the digital input is recognized by information processor 3440 as a valid "awake" pattern, components 3400 enter a communication mode and outputs a "communication established" pattern using on-off pulses of the maintenance unit induction coil current such as, for example, a preprogrammed pulse pattern followed by a constant ON state to allow components 3300 to respond.

Upon detection of the "communication established" pattern, components 3300 will download its status and any stored data via controlled impedance variations applied to sensor apparatus induction coil 3310, i.e., using signals converted into patterns of impedance changes. After the sensor apparatus has downloaded any stored data, components 3300 will continue to communicate status information about power supply 3322. Maintenance unit induction coil 3410 will remain in the ON, energized state as long as components 3300 continue to indicate a need to charge power supply 3322.

A more detailed description of an embodiment of the present invention will be presented next. An autonomous sensor system similar to that described in OnWafer Technologies, Inc. U.S. Pat. No. 6,691,068 filed on 22 Aug. 2000 is provided with an inductive coupling coil approximately 3 cm in diameter and containing approximately 10 turns. The inductive coil is fabricated as an integral part of a Printed Circuit Board (PCB) upon which the electrically active components of the sensor apparatus, also referred to as "sensor system," are disposed.

The inductive coil is connected to a rectification circuit consisting of two diodes and a capacitor configured as a commonly used voltage doubler. One feature of this rectification circuit is that the series capacitor serves to block the reverse flow of DC current. The output of the rectification circuit is connected to the sensor battery, either directly or through a voltage regulation element. The characteristics of the capacitor and diodes are optimized for use at frequencies between 400 KHz and 4 MHz, induced voltages of 2 to 10 volts peak to peak (open circuit), and induced currents of 0.5 to 5 mA (short circuited). In this preferred embodiment, the inductive coupling circuit is designed to be series resonant within the specified frequency range.

The inductive coil is also connected to a voltage detection circuit that includes a commonly used low pass RC filter. The low pass filter either may be directly connected to the inductive coil through a diode or may be connected at the diode node within the rectification circuit. The specific values of the resistor and capacitor are selected based on the desired communication rate and the frequency of the charging current. The values are selected so as to block the high frequency charging frequency while allowing the lower frequency communications to pass through. The output of this low pass detection circuit is provided as a digital input to the information processor, such as a microprocessor, of the sensor apparatus. A current induced in the inductive coil will result in an "ON" condition being detected by the microprocessor; no current will result in an "OFF" condition. In a preferred embodiment, the voltage detection circuit is designed to be sensitive to signals between 9.6 KHz and 57.6 KHz.

A switching element is also connected to the inductive coil. The switching element is connected across the two ends of the inductive coil such that when activated the switching element produces a low impedance across the coil. The switching element is connected to and controlled by the sensor apparatus microprocessor. In one embodiment of the present invention, the switching element is an NMOS transistor. The activation of the switching element produces a significant change in the impedance of the inductive coil. The activation of the impedance-switching element requires very little power, thus communication with the external system does not consume significant amounts of stored battery energy. The NMOS transistor is selected to have a voltage rating of greater than 20 volts and a turn on voltage of less than 3 volts.

The combination of the rectification circuitry, the voltage detection circuit, and the impedance switching circuit supports both the battery charging function and bidirectional communication.

In one embodiment, the external charging coil is approximately 3 cm in diameter and consists of 5 turns. The coil is constructed as an integral part of the power charger printed circuit board. In one implementation, the external charging coil and the coupling coil within the sensor apparatus are coaxially aligned with a separation of 1 to 10 mm. The charging coil and its associated components are designed to be series resonant between 400 KHz and 4 MHz.

In one embodiment, the external charging coil is driven by a standard oscillator through a current buffer element. The current buffer element may be enabled or disabled by a digital signal provided by an external control system. An example implementation utilizes a digitally controlled oscillator enabling the oscillation frequency to be easily optimized. The preferred embodiment allows oscillator frequencies between 400 KHz and 4 MHz. The time response of the current buffer is selected so as to allow switching between the enabled and disenabled states at the desired communications frequency (9.6 KHz to 57.6 KHz). Communication to the autonomous sensor system is achieved by switching the charging current on and off in a predetermined pattern.

In addition to the oscillator and current buffer, the external charging circuit is connected to an impedance monitoring circuit such as those found in an impedance meter. In one implementation, this circuit includes a capacitively coupled tuned amplifier providing an input to a comparator through a low pass filter circuit. The amplifier is tuned to selectively amplify signals at or near the desired communications frequency (9.6 KHz to 57.6 KHz). The action of the low pass filter and the comparator circuit produces a digital output corresponding to the apparent impedance or loading of the charging coil. The activation of the impedance switching circuit within the autonomous sensor system produces a change in loading on the external charging coil. This change is detected by the impedance monitoring circuit.

The combination of a gated oscillator/buffer circuit and an impedance monitoring circuit supports the ability to provide power to the autonomous sensor system as well as bidirectional communication.

Embodiments of the present invention can provide one or more features such as wireless power coupling to the autonomous sensor system, simultaneous communication and power coupling using the same coil, very low power consumption communication between the sensor apparatus and the charging system in the maintenance unit, and a simple circuit design having few components.

One of ordinary skill in electronic design would recognize that many of the details of the disclosed embodiments are subject to modifications and alternate implementation. In view of the present disclosure, some of these obvious extensions and modifications areas follow:

Coil design—the preferred embodiment uses two 3 cm diameter coils with 10 and 5 turns respectively. The size, number of turns, method of construction and relative orientation of the coils is readily modified to optimize their use in a specific implementation.

Charger coil driver—the preferred embodiment utilizes a digitally controlled oscillator and a gated current buffer to achieve the desired functions. A number of different oscillator types, frequency range, and modulation methods could be used to achieve similar results.

Current rectification—the preferred embodiment utilizes a voltage doubler rectification circuit. This circuit has advantages for some embodiments of the present invention, but the circuit could easily be replaced with a number of other commonly known rectification circuits.

Charging detection circuit—the preferred embodiment uses a low pass filtered voltage detection circuit to determine the state of the charging current. This simple circuit requires a minimal number of passive components, but this circuit could be implemented in numerous ways.

Impedance modulation—the preferred embodiment modulates the impedance of the inductive coupling coil within the sensor apparatus in order to communicate with the maintenance unit. This method has specific benefits in some embodiments of the present invention, but is not an essential element. Communication with the external system could be achieved in a number of alternative ways, for example, by imposing an active signal on the inductive coupling coil.

Impedance detection—the preferred embodiment implements communication from the autonomous sensor system to the external system by detecting loading changes in the charging coil. This method has the advantage of allowing simultaneous charging and communication with minimal power consumption within the autonomous sensor system. A number of different circuit configurations could be used to detect either the loading effect or other modulated signals coupled into the charging coil.

In another embodiment, the communication device comprises a power charger for providing power to charge the sensor apparatus. The communication device comprises a primary coil, an oscillator circuit capable of producing an alternating current flow within the primary coil, a circuit capable of modulating a characteristic of the primary coil, and a circuit capable of detecting changes in a characteristic of the primary coil. The communication device is configured for providing power to the primary coil at a driving frequency between 400 KHz and 4 MHz. The primary coil is series resonant between 400 KHz and 4 MHz. The communication device may be configured for modulating the driving frequency at a frequency between 9.6 KHZ and 57.6 KHz and the modulation comprises an amplitude variation between less than 20% and greater than 80% of the maximum signal level of the power provided to the primary coil. The communication device may be configured for modulating the driving frequency and the modulation comprises abrupt changes in the driving frequency in the range from about 400 KHZ to about 4 MHz. The detected changes in the characteristic of the primary coil may comprise apparent impedance changes for the primary coil. The communication device may be configured for measuring changes in the apparent impedance of the primary coil by measuring changes in the amplitude of the driving voltage applied to the primary coil. The apparent impedance changes, as an option, may be at frequencies between 9.6 KHz and 56.7 kHz. The communication device may be configured for modulating the driving frequency; the modulation comprises modulating the amplitude of an electrical signal applied to the primary coil. As another option, the communication device is configured for modulating the frequency of an electrical signal applied to the primary coil. In another embodiment, the detected change in the state of the secondary coil is the presence or absence of an electrical signal within a predetermined frequency range.

Figure 10:
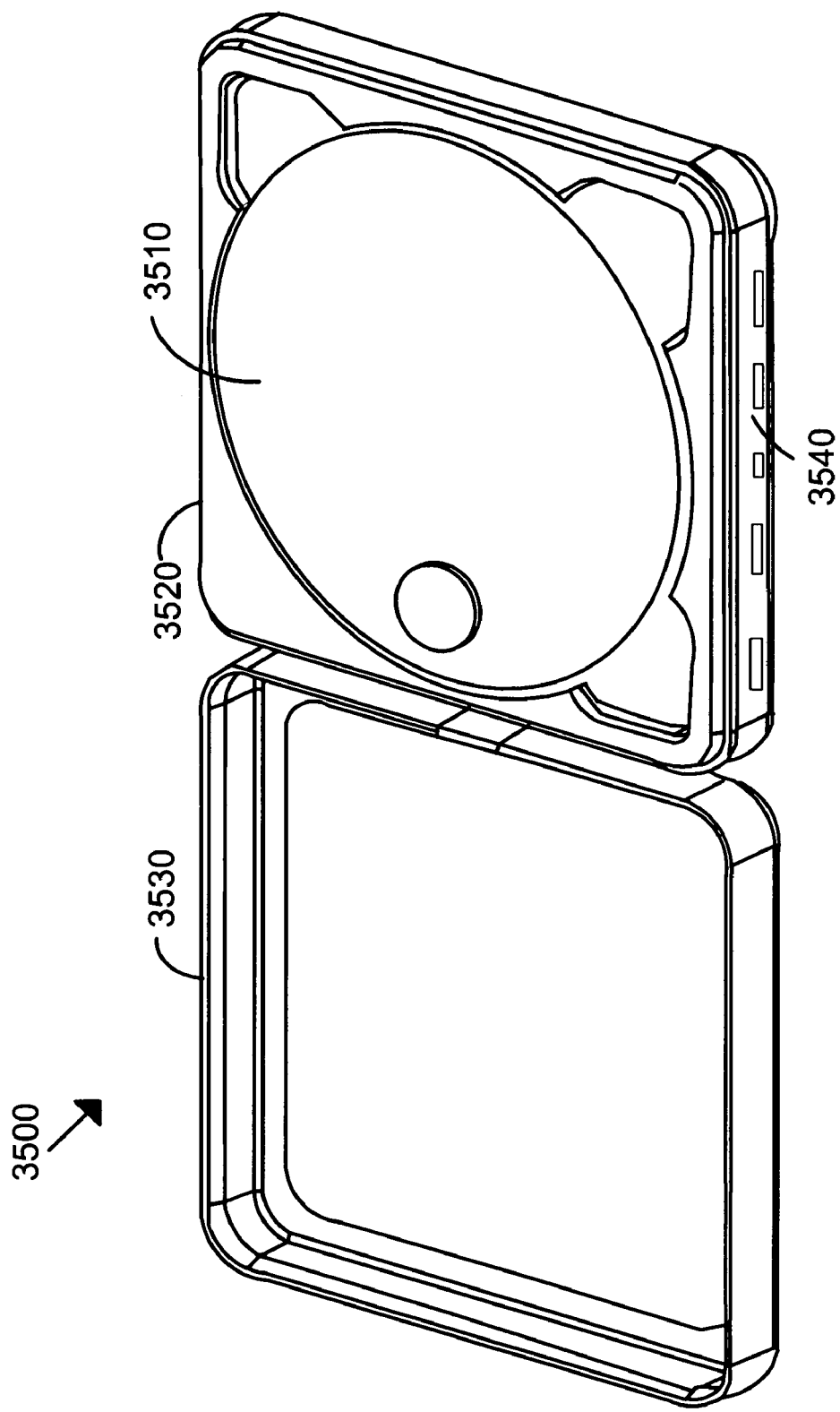
FIG. 10 is a diagram of an embodiment of the present invention.

Reference is now made to FIG. 10 where there is shown a perspective view of a maintenance unit 3500 for holding a single sensor apparatus 3510 according to one embodiment of the present invention. Maintenance unit 3500 shown in FIG. 10 comprises a housing 3520 with a hinged lid 3530; the lid can be closed so that the interior of the housing can be substantially isolated from the surrounding environment. The view shown in FIG. 10 has maintenance unit 3500 open and sensor apparatus 3510 is present in housing 3520. Maintenance unit 3500 shown in FIG. 10 includes electronic components substantially the same as those described for the embodiments presented for the descriptions of FIG. 1-10. The electronic components for maintenance unit 3500 are incorporated in housing 3520 so that they are not visible in FIG. 10.

Maintenance unit 3500 also includes a visual display 3540 mounted on an exterior wall of the maintenance unit. Display 3540 may be a display such as a light emitting diode (LED) display, a liquid crystal display (LCD), and other types of visual display, coupled to the housing of the maintenance unit. Display 3540 is connected with the electronics module so as to receive information and power for operating the display. Preferably, display 3540 can be viewed with housing 3520 closed. Display 3540 can be used for visually conveying status information about the maintenance unit and/or the status of the sensor apparatus contained in the maintenance unit.

For some embodiments of the present invention, the maintenance unit may be configured for automatically testing the sensor apparatus to get information such as battery life state, such as end of life, brand new, etc. The maintenance unit may also be configured for communications with a factory automation system for downloading data collection instructions, and for telling the equipment which wafer to pick out of the maintenance unit. In other words, the maintenance unit may further comprise a communication device for communication with an external information source.

Alternative embodiments of the present invention will be clear to those of ordinary skill in the art in light of the present disclosure. For example, the maintenance unit concept, according to embodiments of the present invention, can be used for substantially all standard wafer boxes, such as a front opening unified pods (FOUP), standard mechanical interface boxes, wafer cassettes, single-wafer FOUPs, and others. A 300 mm front opening unified pod version is shown in FIG. 3.

Optionally, single-wafer maintenance units can be fabricated that do not resemble a standard mechanical interface; such units would still be able to provide maintenance activities such as the automatic power recharging and data downloading capability without the large size of the full cassette versions. This is shown in FIG. 10. These would be useful for research personnel, field repair personnel, educational users, and others who do not have the need for multiple sensor apparatuses, or for automatic interfacing into factory automation systems, but do want the ease-of-use aspect provided by the automatic recharging and data downloading functionality.

In another embodiment, the maintenance unit is configured to be inserted inside a processing tool. In other words, the process equipment can be designed to include a chamber, preferably dedicated, for containing the maintenance unit. For some applications, it is useful, for example, to have multiple sensor apparatuses stored inside a lithography track system. In this way, the track could automatically pull a sensor apparatus out of the internal storage and run it through the track, without having to interface with the Factory Automation system to retrieve the maintenance unit from storage. In this scenario, much of the automated charging and data download functionality of the maintenance unit would be incorporated into the internal environment where the sensor apparatuses are stored inside the equipment. The maintenance unit for this type of application would be mechanically configured to fit within a chamber of the processing tool.

Figure 11:
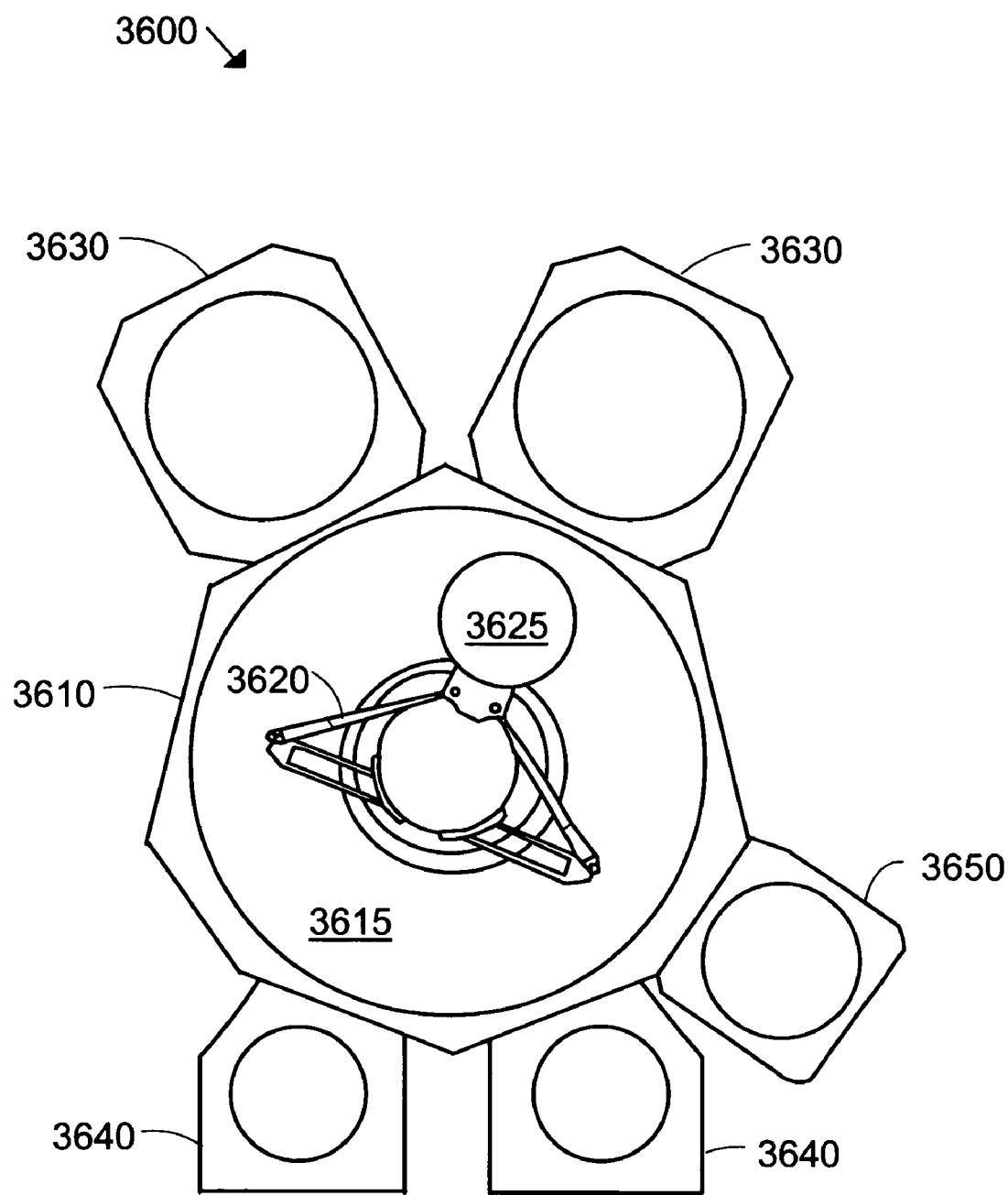
FIG. 11 is a diagram of an embodiment of the present invention.

Reference is now made to FIG. 11 where there is shown another embodiment of the present invention. FIG. 11 shows a schematic top view of a process tool 3600 according to one embodiment of the present invention. Process tool 3600 is configured for processing workpieces such as semiconductor wafers, flatpanel display substrates, and photolithography masks. Process tool 3600 includes a workpiece handler 3610, which includes a handler chamber 3615 containing a workpiece handler robot 3620. For purposes of illustration, FIG. 11 shows robot 3620 holding a workpiece 3625 such as a semiconductor wafer. Workpiece handlers are commonly used in processing workpieces such as semiconductor wafers. Workpiece handlers such as those used for processing semiconductor wafers typically have multiple sides, sometimes referred to as facets. The sides are typically configured with a port for transmitting a workpiece therethrough. Additional chambers are attached at the sides of the workpiece handler so that the robot can move the workpiece between the chambers. For the embodiment shown in FIG. 11, workpiece handler 3610 has eight sides; a process chamber 3630 is connected to one of the sides, another process chamber 3630 is connected to a second side. A load lock 3640 is connected to one of the eight sides and a second load lock 3640 is connected to another one of the eight sides. Optionally process chamber 3630 may be configured for a process such as etch, plasma etch, post exposure bake, chemical mechanical planarization, chemical vapor deposition, sputter deposition, drying, ion implantation, plasma enhanced chemical vapor deposition, and photoresist strip. The embodiment shown in FIG. 11 further includes a sensor apparatus maintenance chamber 3650 connected to one of the eight sides of workpiece handler 3610.

Sensor apparatus maintenance chamber 3650 is configured for storing and maintaining a sensor apparatus such as the sensor apparatus described supra. Sensor apparatus maintenance chamber 3650 is preferably configured for holding a sensor apparatus that has dimensions similar to those of the workpiece for which the workpiece process tool processes. Of course, sensor apparatus maintenance chamber 3650 may be modified to accommodate differences that may exist between the workpiece and the sensor apparatus. In one embodiment, sensor apparatus maintenance chamber 3650 is configured for holding one sensor apparatus; in an alternative embodiment, sensor apparatus maintenance chamber 3650 is configured for holding more than one sensor apparatus.

For one embodiment of the present invention, sensor apparatus maintenance chamber 3650 comprises a housing, an information processor, a power supply, an information transmitter-receiver, a power charger for coupling power from the power supply to charge the sensor apparatus power source, a sensor apparatus detector, and a sensor apparatus orientation detector. Preferably, sensor apparatus maintenance chamber 3650 is configured so as to have the capabilities of the maintenance units described supra for FIG. 1, FIG. 1A, FIG. 1B, FIG. 1C, and FIG. 2.

Other embodiments of sensor apparatus maintenance chamber 3650 may have configurations different from the configurations described for FIG. 1, FIG. 1A, FIG. 1B, FIG. 1C, and FIG. 2 because sensor apparatus maintenance chamber 3650 is part of process tool 3600 and can share other components of process tool 3600 rather than having duplication of components. As an example embodiment, sensor apparatus maintenance chamber 3650 may share an information processor that is part of process tool 3600 rather than having an information processor dedicated to maintenance chamber 3650. For another embodiment of the present invention, sensor apparatus maintenance chamber 3650 may not include a sensor apparatus detector because process tool 3600 may be configured for tracking the location of the sensor apparatus. Similarly, process tool 3600 may be configured for controlling the orientation of the sensor apparatus so that the sensor apparatus can be provided to sensor apparatus maintenance chamber 3650 with a predetermined orientation. In a preferred embodiment, sensor apparatus maintenance chamber 3650 is connected with the power resource used for powering process tool 3600 rather than having a power supply dedicated to maintenance chamber 3650. A typical power resource for the process tool is the facility electrical power, which may also be referred to as the house electrical power.

In view of the present disclosure, a person of ordinary skill in the art will recognize configurations for other embodiments of the present invention. In another example embodiment of the present invention, sensor apparatus maintenance chamber 3650 may also be configured to function as a load lock for transferring workpieces. In other words, the functions of sensor apparatus maintenance chamber 3650 are combined with the functions of a load lock. Such a configuration would reduce the footprint of the process tool and release another side of workpiece handler 3610 for other uses.

Figure 12:
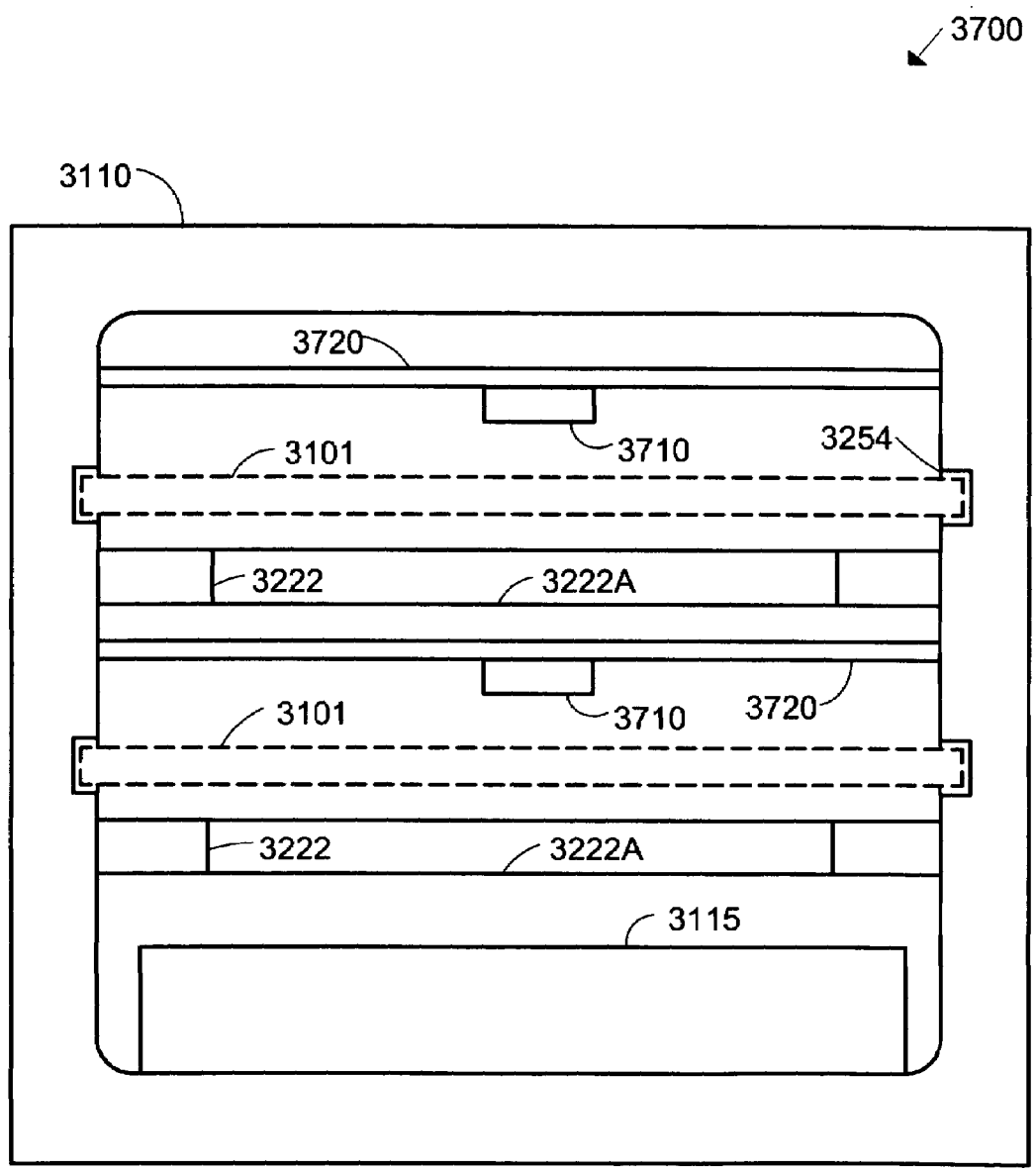
FIG. 12 is a diagram of an embodiment of the present invention.

Reference is now made to FIG. 12 where there is shown a maintenance unit 3700 according to another embodiment of the present invention. Maintenance unit 3700 is essentially the same as that described for the embodiment shown in FIG. 1, FIG. 3, and FIG. 7 with the exception that the embodiment shown in FIG. 12 provides more details of a preferred configuration. Maintenance unit 3700 includes a housing 3110 and an electronics module 3115, which are substantially the same as those described for FIG. 1 and FIG. 3. Maintenance unit 3700 further includes a coil 3222 embedded in a surface of housing 3110 that forms a hole 3222A, for illustration purposes, a sensor apparatus 3101 (illustrated in dashed lines) is shown in each of two slots configured in maintenance unit 3700 for holding a sensor apparatus. Maintenance unit 3700 further includes a camera 3710 for each sensor apparatus 3101. Camera 3710 is disposed with respect to each sensor apparatus 3101 so as to view the top surface of sensor apparatus 3101. Camera 3710 is configured to take a picture of the surface of sensor apparatus 3101 and the image is used for determining the orientation of sensor apparatus 3101 as described supra. In a preferred embodiment, camera 3710 is suspended above the center of sensor apparatus 3101 using a camera support 3720.

Another embodiment of the present invention comprises a combination of a maintenance unit, such as the maintenance units described for FIG. 1, FIG. 1A, FIG. 1B, FIG. 1C, FIG. 2, FIG. 3, FIG. 7, FIG. 8, FIG. 9, and FIG. 12, and a sensor apparatus that is essentially the same as those described supra. More specifically, the sensor apparatus includes an information processor and a power source. The maintenance unit is configured for wirelessly recharging the power source incorporated in the sensor apparatus. The information processor is connected with the power source so as to be capable of monitoring the recharging of the power source. More specifically, the information processor is configured for detecting when power is no longer being received from the maintenance unit. The information processor is further programmed with executable instructions that include initiating commands for controlling the collection of data. In other words, the information processor is arranged to trigger a predetermined data collection program in response to determining that the sensor apparatus is not receiving power for recharging the power source. For this embodiment, the power charger is configured so that the wireless power coupling efficiency decreases with increases in the distance between the maintenance unit and the sensor apparatus. Preferably, the power coupling efficiency drops substantially to zero when the sensor apparatus leaves or is beyond a short distance from the maintenance unit. A benefit of this configuration is that the sensor apparatus will automatically begin a data collection sequence upon leaving or soon after leaving the maintenance unit: no commands or operator actions are needed to start the data collection process. Optionally, the sensor apparatus may be further configured to terminate the data collection process when recharging of the power source is started. In other words, the sensor apparatus is configured to terminate the data collection when the sensor apparatus has been returned to the maintenance unit.

Another embodiment of the present invention comprises a combination of a sensor apparatus maintenance chamber, such as the sensor apparatus maintenance chamber described for FIG. 11 and a sensor apparatus that is essentially the same as those described supra. More specifically, the sensor apparatus includes an information processor and a power source. The maintenance chamber is configured for wirelessly charging the power source incorporated in the sensor apparatus. The information processor is connected with the power source so as to be capable of monitoring the charging of the power source. More specifically, the information processor is configured for detecting when power is no longer being received from the maintenance chamber. The information processor is further programmed with executable instructions that include initiating commands for controlling the collection of data. In other words, the information processor is arranged to trigger a predetermined data collection program in response to determining that the sensor apparatus is not receiving power for recharging the power source.

Of course, embodiments of the present invention could be applied to other types of wireless sensor systems such as sensor systems for applications other than processing semiconductor wafers, flatpanel display substrates, and photolithography masks. Indeed, the automated charging, data downloading, and data management would be useful in a wide variety of applications that do not involve a sensor apparatus but do involve another device for which communication and power transfer are needed. In other words, embodiments of the present invention are not restricted to sensor apparatus configurations.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A maintenance unit for maintaining and storing a sensor apparatus configured for measuring process conditions for processing a workpiece, the maintenance unit comprising:
   a housing configured for holding the workpiece, the housing being configured for enclosing the sensor apparatus;
   an information processor including executable code for managing and maintaining the sensor apparatus; and
   a communication device for information transfer with the sensor apparatus.

2. The maintenance unit of claim 1 further comprising a power supply for providing power to the information processor.

3. The maintenance unit of claim 1 further comprising a power charger for providing power to charge a power source for the sensor apparatus.

4. The maintenance unit of claim 1 further comprising a power charger for providing power to charge the sensor apparatus, wherein the sensor apparatus includes a battery and a substantially planar secondary coil that includes at least one coil turn, the secondary coil being connected with the battery for charging the battery, the power charger further comprising a substantially planar primary coil having at least two coil turns, at least one of the coil turns being wound in a clockwise direction, at least one of the coil turns being wound in a counter clockwise direction; whereby, placing the secondary coil in a substantially parallel non-coplanar position proximal to the primary coil causes an induction of electrical power in the secondary coil when electrical power is applied to the primary coil.

5. The maintenance unit of claim 4 wherein the axis of the secondary coil is spaced a distance from the axis of the primary coil that equals about one half of the sum of the inside radius of the primary coil and the outside radius of the primary coil.

6. The maintenance unit of claim 4 wherein the power charger is configured so as to provide to the primary coil a primary voltage in the range from about 3 volts and to about 18 volts and all ranges subsumed therein at a primary frequency in the range from about 0.1 MHz to about 4 MHz and all ranges subsumed therein.

7. The maintenance unit of claim 1 wherein the communication device comprises a power charger for providing power to charge the sensor apparatus.

8. The maintenance unit of claim 7 wherein the communication device comprises:
   a primary coil;
   an oscillator circuit capable of producing an alternating current flow within the primary coil;
   a circuit capable of modulating a characteristic of the primary coil; and
   a circuit capable of detecting changes in a characteristic of the primary coil.

9. The maintenance unit of claim 7, wherein the communication device is configured for providing power to the primary coil at a driving frequency between 400 KHz and 4 MHz.

10. The maintenance unit of claim 8, wherein the primary coil is series resonant between 400 KHz and 4 MHz.

11. The maintenance unit of claim 9, wherein the communication device is configured for modulating the driving frequency at a frequency between 9.6 KHZ and 57.6 KHz and the modulation comprises an amplitude variation between less than 20% and greater than 80% of the maximum signal level of the power provided to the primary coil.

12. The maintenance unit of claim 9, wherein the communication device is configured for modulating the driving frequency and the modulation comprises abrupt changes in the driving frequency in the range from about 400 KHZ to about 4 MHz.

13. The maintenance unit of claim 8, wherein the detected changes in the characteristic of the primary coil comprises apparent impedance changes for the primary coil.

14. The maintenance unit of claim 13, wherein the communication device is configured for measuring changes in the apparent impedance of the primary coil by measuring changes in the amplitude of the driving voltage applied to the primary coil.

15. The maintenance unit of claim 14, wherein the apparent impedance changes are at frequencies between 9.6 KHz and 56.7 kHz.

16. The maintenance unit of claim 9, wherein the communication device is configured for modulating the driving frequency and the modulation comprises modulating the amplitude of an electrical signal applied to the primary coil.

17. The maintenance unit of claim 9, wherein the communication device is configured for modulating the frequency of an electrical signal applied to the primary coil.

18. The maintenance unit of claim 1 further comprising a sensor apparatus detector for indicating the presence of a sensor apparatus in the housing.

19. The maintenance unit of claim 1 further comprising an information storage memory for storing at least one of data, calibration coefficients, and commands.

20. The maintenance unit of claim 1 further comprising a connector for receiving power from an external power resource.

21. The maintenance unit of claim 1 further comprising a communication device for communication with an external information source.

22. In a combination:
a housing for at least partially enclosing a sensor apparatus;
an information processor including executable code for managing and maintaining the sensor apparatus;
a communication device for information transfer with the sensor apparatus;
a power source for providing power to the information processor;
a power charger for providing power to charge the sensor apparatus;
a sensor apparatus detector;
a sensor apparatus orientation detector;
an information storage memory for storing at least one of data, calibration coefficients, and commands;
a connector for receiving power from an external power resource; and
a second communication device for communication with an external information source.

23. The combination of claim 22, wherein the housing comprises a standard mechanical interface box, a front opening unified pod, or a wafer cassette.

24. The combination of claim 22, wherein the housing comprises a semiconductor wafer cassette.

25. The combination of claim 23, wherein the housing is configured for holding a semiconductor wafer, a flatpanel display substrate, or a lithography mask substrate.

26. A maintenance unit for maintaining and storing a sensor apparatus, the maintenance unit comprising:
a housing for enclosing the sensor apparatus;
an information processor including executable code for managing and maintaining the sensor apparatus; and
a communication device for information transfer with the sensor apparatus;
wherein the communication device comprises a power charger for providing power to charge the sensor apparatus.

27. The maintenance unit of claim 26 wherein the communication device comprises:
a primary coil;
an oscillator circuit capable of producing an alternating current flow within the primary coil;
a circuit capable of modulating a characteristic of the primary coil; and
a circuit capable of detecting changes in a characteristic of the primary coil.

28. The maintenance unit of claim 26, wherein the communication device is configured for providing power to the primary coil at a driving frequency between 400 KHz and 4 MHz.

29. The maintenance unit of claim 27, wherein the primary coil is series resonant between 400 KHz and 4 MHz.

30. The maintenance unit of claim 28, wherein the communication device is configured for modulating the driving frequency at a frequency between 9.6 KHZ and 57.6 KHz and the modulation comprises an amplitude variation between less than 20% and greater than 80% of the maximum signal level of the power provided to the primary coil.

31. The maintenance unit of claim 28, wherein the communication device is configured for modulating the driving frequency and the modulation comprises abrupt changes in the driving frequency in the range from about 400 KHZ to about 4 MHz.

32. The maintenance unit of claim 27, wherein the detected changes in the characteristic of the primary coil comprises apparent impedance changes for the primary coil.

33. The maintenance unit of claim 32, wherein the communication device is configured for measuring changes in the apparent impedance of the primary coil by measuring changes in the amplitude of the driving voltage applied to the primary coil.

34. The maintenance unit of claim 33, wherein the apparent impedance changes are at frequencies between 9.6 KHz and 56.7 kHz.

35. The maintenance unit of claim 28, wherein the communication device is configured for modulating the driving frequency and the modulation comprises modulating the amplitude of an electrical signal applied to the primary coil.

36. The maintenance unit of claim 28, wherein the communication device is configured for modulating the frequency of an electrical signal applied to the primary coil.

37. A maintenance unit for maintaining and storing a sensor apparatus, the maintenance unit comprising:
a housing for enclosing the sensor apparatus;
an information processor including executable code for managing and maintaining the sensor apparatus;
a communication device for information transfer with the sensor apparatus; and
a sensor apparatus detector for indicating the presence of a sensor apparatus in the housing.

* * * * *